United States Patent
Cohen et al.

(10) Patent No.: US 10,562,226 B1
(45) Date of Patent: Feb. 18, 2020

(54) ADDITIVE MANUFACTURING OF ACTIVE DEVICES USING DIELECTRIC, CONDUCTIVE, AND MAGNETIC MATERIALS

(71) Applicant: Southern Methodist University, Dallas, TX (US)

(72) Inventors: Adam Cohen, Dallas, TX (US); Paul Krueger, Plano, TX (US); Edmond Richer, Richardson, TX (US)

(73) Assignee: Southern Methodist University, Dallas, TX (US)

( * ) Notice: Subject to any disclaimer, the term of this patent is extended or adjusted under 35 U.S.C. 154(b) by 909 days.

(21) Appl. No.: 14/213,136

(22) Filed: Mar. 14, 2014

Related U.S. Application Data

(60) Provisional application No. 61/792,065, filed on Mar. 15, 2013.

(51) Int. Cl.
| | | |
|---|---|---|
| *B29C 64/209* | (2017.01) | |
| *B29C 64/118* | (2017.01) | |
| *B29C 70/38* | (2006.01) | |
| *B29C 48/00* | (2019.01) | |
| *B29C 48/25* | (2019.01) | |
| *B29C 64/232* | (2017.01) | |
| *B33Y 30/00* | (2015.01) | |
| *B33Y 40/00* | (2020.01) | |
| *B29C 48/22* | (2019.01) | |

(Continued)

(52) U.S. Cl.
CPC ........ *B29C 64/209* (2017.08); *B29C 48/0022* (2019.02); *B29C 48/266* (2019.02); *B29C 64/118* (2017.08); *B29C 70/38* (2013.01); *B29C 48/22* (2019.02); *B29C 48/30* (2019.02); *B29C 48/325* (2019.02); *B29C 64/232* (2017.08); *B33Y 30/00* (2014.12); *B33Y 40/00* (2014.12)

(58) Field of Classification Search
None
See application file for complete search history.

(56) References Cited

U.S. PATENT DOCUMENTS 2,688,343 A * 9/1954 Cuddeback ....... B29C 66/12861
138/133
3,046,178 A 7/1962 Tupper
(Continued)

FOREIGN PATENT DOCUMENTS

DE 102011109369 2/2013
EP 3219474 A1 * 9/2017

OTHER PUBLICATIONS

Jacob Bayless et al. (2010) "Wire Embedding 3D Printer", University of British Columbia (http://reprap.Org/mediawiki/images/2/25/SpoolHead_FinalReport.pdf) retrieved Feb. 17, 2017.*
(Continued)

*Primary Examiner* — Seyed Masoud Malekzadeh
*Assistant Examiner* — Manley L Cummins, IV
(74) *Attorney, Agent, or Firm* — Fish & Richardson P.C.

(57) ABSTRACT

The present invention includes a process, system and apparatus for multi-material additive manufacturing process comprising: extruding an extrudable material through a nozzle capable of moving along one or more axis and concurrently extruding one or more filaments, wherein the filament is embedded in, on or about the extrudable material from the nozzle.

18 Claims, 8 Drawing Sheets

(51) Int. Cl.
  *B29C 48/30* (2019.01)
  *B29C 48/325* (2019.01)

(56) References Cited

U.S. PATENT DOCUMENTS

| | | | | |
|---|---|---|---|---|
| 3,405,213 | A * | 10/1968 | Munz | G01D 7/10 264/245 |
| 3,557,403 | A * | 1/1971 | Lemelson | B29C 47/02 425/113 |
| 5,121,329 | A * | 6/1992 | Crump | B22F 3/115 228/180.5 |
| 5,578,227 | A * | 11/1996 | Rabinovich | B23K 26/34 219/121.63 |
| 5,936,861 | A * | 8/1999 | Jang | B29C 70/384 700/98 |
| 6,144,008 | A | 11/2000 | Rabinovich | |
| 6,153,034 | A * | 11/2000 | Lipsker | B29C 41/36 156/73.1 |
| 6,437,034 | B2 | 8/2002 | Lombardi et al. | |
| 6,604,686 | B1 | 8/2003 | Taban | |
| 7,556,490 | B2 | 7/2009 | Wicker et al. | |
| 7,572,403 | B2 * | 8/2009 | Gu | B29C 41/36 156/356 |
| 7,917,243 | B2 | 3/2011 | Kozlak et al. | |
| 8,070,473 | B2 | 12/2011 | Kozlak et al. | |
| 8,221,669 | B2 * | 7/2012 | Batchelder | B29C 64/386 264/308 |
| 9,511,543 | B2 | 12/2016 | Tyler | |
| 2005/0109451 | A1 * | 5/2005 | Hauber | B29C 70/388 156/250 |
| 2012/0070619 | A1 * | 3/2012 | Mikulak | B29C 47/0014 428/156 |
| 2014/0027952 | A1 * | 1/2014 | Fan | B05D 5/12 264/401 |
| 2014/0061974 | A1 * | 3/2014 | Tyler | B29C 67/0055 264/401 |
| 2014/0232035 | A1 | 8/2014 | Bheda | |
| 2014/0268604 | A1 * | 9/2014 | Wicker | B29C 70/885 361/760 |

OTHER PUBLICATIONS

Periard et al. (2007) "Printing Embedded Circuits" Solid Freeform Fabrication Symposium Proceedings, Austin, TX, Aug. 2007 ("PERIARD"). Web (https://sffsymposium.engr.utexas.edu/Manuscripts/2007/2007-43-Periard.pdf) retrieved Feb. 17, 2017.*
U.S. Appl. No. 61/694,253, filed Aug. 29, 2012, Tyler.
Ober et al. "*Active Mixing of complex Fluids at the Microscale*"; School of Engineering and Applied Science, Wyss Institute for Biologically Inspired Engineering, Harvard University, Cambridge, MA, Aug. 25, 2015; 6 pages.
Agarwala, M. K., et al. (1996), Fused Deposition of ceramics and metals: an overview. Solid Freeform Fabrication Symposium Proceedings, Austin, TX, Aug. 1996, pp. 385-392.
Alonso, Matthew Paul et al. (2009) "Reprinting the Telegraph: Replicating the Vail Register using Multi-materials 3D Printing", Solid Freeform Fabrication Symposium Proceedings, Austin, TX, Aug. 2009, pp. 761-769.
Bayer, R.K. et al. (1988) "Conductive PE-carbon composite by elongation flow injection moulding, Part 1—Flow-induced conductivity profile-high molecular weight matrix", Journal of Materials Science, 23, 475-480.
Bayless, Jacob et al. (2010) "Wire Embedding 3D Printer", University of British Columbia (http://reprap.org/mediawiki/images/2/25/SpoolHead_FinalReport.pdf).
Brauer, John; Magnetic Actuators and Sensors, Chpt 7; Milwaukee School of Engineering; Wiley-Interscience; (c) IEEE Magnetic Society; 35 pages.
Cutkosky, Mark R. and Sangbae Kim (2009) Design and fabrication of multi-material structures for bioinspired robots. Phil. Trans. R. Soc. A 2009 367, pp. 1799-1813.
DeNava, Erick et al. (2008) "3D Off-Axis Component Placement and Routing with Solid Freeform Fabrication," Solid Freeform Fabrication Symposium Proceedings, Austin, TX, Aug. 2008, pp. 362-369.
Diegel, Olaf et al. (2011) "Getting rid of the wires: Curved Layer Fused Deposition Modeling in Conductive Polymer Additive Manufacturing", Key Engineering Materials (vols. 467-469), pp. 662-667.
Drobny, Jiri George (2011) Polymers for Electricity and Electronics: Materials, Properties, and Applications, Wiley, pp. 225-227.
Elkins, Kurt et al. (1997) "Soft Elastomers for Fused Deposition Modeling", Solid Freeform Fabrication Symposium Proceedings, Austin, TX, Aug. 1997, pp. 441-448.
Encica, Laurentiu et al. (2008) "Passive and active constant force-displacement characteristics and optimization of a long-stroke linear actuator," 11th International Conference on Optimization of Electrical and Electronic Equipment, OPTIM 2008., pp. 117-124, May 22-24, 2008.
Espalin, David et al. (2012) "Multi-Material, Multi-Technology FDM System", Solid Freeform Fabrication Symposium Proceedings, Austin, TX, Aug. 2012, pp. 828-835.
Ezquerra, T.A. et al. (1988) "Conductive PE-carbon black composites by elongation flow injection moulding, Part 2—Variation of the molecular weight of the matrix", Journal of Materials Science, 23, 4121-4126.
Flandin., L. et al. (2001) "Interrelationships between electrical and mechanical properties of a carbon black-filled ethylene-octene elastomer", Polymer, 42, 827-838.
Gilleo, Ken (2000) "Flip Chip Assembly with Conductive Adhesives", Proceedings, 2000 HD International Conference on High-Density Interconnect and Systems Packaging, Denver, CO, Apr. 2000, pp. 256-260.
Harman, George (1997) Wire Bonding in Microelectronics: Materials, Processes, Reliability, and Yield, Chapter 1—Technical Introduction to the Second Edition; pp. 1-10; McGraw-Hill Professional, 2nd edition (Jun. 1, 1997).
Huang, J.-C. (2002) "Carbon Black Filled Conducting Polymers and Polymer Blends", Advances in Polymer Technology, 21, 299-313.
Kalyon, D. M. et al. (2002) "Electrical Properties of Composites as Affected by the Degree of Mixedness of the Conductive Filler in the Polymer Matrix", Polymer Engineering and Science, 42, 1609-1617.
Kumar, S. and J.-P. Kruth (2010) "Composites by rapid prototyping technology", Materials and Design 31, pp. 850-856.
Lesquesne, B. (1988) "Finite element analysis of a constant force solenoid for fluid flow control", IEEE Trans. Indust. Appl., vol. 24, pp. 574-581.
Li, Y. and H. Shimizu (2009) "Toward a Stretchable, Elastic, and Electrically Conductive Nanocomposite: Morphology and Properties of Poly[styrene-b-(ethylene-co-butylene)-b-styrene]/Multiwalled Carbon Nanotube Composites Fabricated by High-Shear Processing", Macromolecules, 42, 2587-2593.
Lima, Marcio D. et al. (2012), "Electrically, Chemically, and Photonically Powered Torsional and Tensile Actuation of Hybrid Carbon Nanotube Yarn Muscles", Science Nov. 16, 2012: vol. 338 No. 6109 pp. 928-932.
Lopes, Amit Joe et al. (2012) "Integrating stereolithography and direct print technologies for 3D structural electronics fabrication", Rapid Prototyping Journal, vol. 18 Iss: 2, pp. 129-143.
Malone, Evan and Hod Lipson (2008), Multi-material Freeform Fabrication of Active Systems, Proceedings of the 9th Biennial ASME Conference on Engineering Systems Design and Analysis, Jul. 2008, Haifa, Israel.
Malone, Evan and Hod Lipson (2007) "Freeform Fabrication of a Complete Electromechanical Relay", Solid Freeform Fabrication Symposium Proceedings, Austin, TX, Aug. 2007, pp. 513-526.
Masood,S.H. and W.Q. Song (2004) "Development of new metal/polymer materials for rapid tooling used Fused Deposition Modeling", Materials and Design 25, pp. 587-594.
Mireles, Jorge et al. (2012) "Fused Deposition Modeling of Metals", Solid Freeform Fabrication Symposium Proceedings, Austin, TX, Aug. 2012, pp. 836-845.

(56) References Cited

OTHER PUBLICATIONS

McNulty, Thomas F. et al. (1998) "Development of a Binder Formulation for Fused Deposition of Ceramics", Rapid Prototyping Journal, vol. 4 Iss: 4, pp. 144-150.
Nikzad, M. et al. (2011) "Thermo-mechanical properties of a highly filled polymer composites for Fused Deposition Modeling" Materials and Design 32, pp. 3448-3456.
Onagoruwa, Seyi et al. (2001) "Fused Deposition of Ceramic (FDC) and Composites", Solid Freeform Fabrication Symposium Proceedings, Austin, TX, Aug. 2001, pp. 224-231.
O'Reilly, Mike and Jeff Leal (2010) "Jetting Your Way to Fine-pitch 3D Interconnects", Chip Scale Review, Oct. 2010.
Periard et al. (2007) "Printing Embedded Circuits" Solid Freeform Fabrication Symposium Proceedings, Austin, TX, Aug. 2007.
Ruschau, G.R. and R.E. Newnham (1992) "Critical Volume Fractions in Conductive Composites", Journal of Composite Materials, 26, 2727.
Ruschau, G.R. et al. (1992) "Resistivities of conductive composites", Journal of Applied Physics, 72, 953-959.
Sau, K. P. et al. (1997) "Conductive rubber composites from different blends of ethylene-propylene-diene rubber and nitrile rubber", Journal of Materials Science, 32, 5717-5724.
Seok, Sangok, "Meshworm: A Peristaltic Soft Robot With Antagonistic Nickel Titanium Coil Actuators", IEEE/ASME Transactions on Mechatronics 1 (in publication).
Tadesse, Yonas et al. (2011) "Twelve Degree of Freedom Baby Humanoid Face using Shape Memory Alloy Actuators", Journal of Mechanisms and Robotics vol. 3, pp. 1-18.
Vaidyanathan, R. et al. (1999) "Extrusion Freeform Fabrication of Functional Ceramic Prototypes", Solid Freeform Fabrication Symposium Proceedings, Austin, TX, Aug. 1999, pp. 327-334.
Walker, Ian D. et al. (2005) "Continuum Robots Arms Inspired by Cephalopods", Unmanned Ground Vehicle Technology VII, Proceedings of SPIE vol. 5804.
Office Action in related U.S. Appl. No. 14/213,908; dated Nov. 3, 2017; 17 pages.
Saari et al., "Active Device Fabrication Using Fiber Encapsulation Additive Manufacturing," Proceedings of the International Solid Freeform Fabrication Symposium, pp. 26-39, Aug. 2015, 14 pages.

\* cited by examiner

ADDITIVE MANUFACTURING OF ACTIVE DEVICES USING DIELECTRIC, CONDUCTIVE, AND MAGNETIC MATERIALS

CROSS-REFERENCE TO RELATED APPLICATIONS

This application claims the benefit of priority of U.S. Application Ser. No. 61/792,065 (filed on Mar. 15, 2013), which is incorporated by reference herein in its entirety.

TECHNICAL FIELD OF THE INVENTION

The present invention relates generally to the fields of additive manufacturing/3-D printing, robotics, electronic packaging, biomedical devices, and other fields.

STATEMENT OF FEDERALLY FUNDED RESEARCH

None.

BACKGROUND OF THE INVENTION

Without limiting the scope of the invention, its background is described in connection with 3-D printing.

Multi-material and composite AM: Objet's (Rehovot, Israel) Polyjet™ technology can print structures from two dielectric photopolymers. Multi-material stereolithography using multiple vats of liquid (dielectric) photopolymer has been demonstrated [Wicker et al., 2009], and multi-material FDM has been explored [Espalin, 2012]. Ceramic and metal composites made with FDM have been described by several researchers [Kumar and Kruth, 2010; Vaidyanathan et al., 1999; Onagoruwa et al., 2001; McNulty et al., 1998; Agarwala et al., 1996] and FDM-produced injection molding dies using metallic composites were made [Masood and Song, 2004] and characterized for thermal conductivity [Nikzad et al., 2011].

Electromechanical structures by AM: FDM of ABS and low-melting point alloys such as Bi58Sn42 has been used to make simple multilayer structures having a dielectric structural component and an electrical conductor [Mireles et al., 2012]. However, this approach is limited by the relatively high electrical resistance of solders (Bi58Sn42 solder has ~22 times higher resistivity than annealed Cu); maintaining the integrity of solder melting at 138° C. while adjacent to polymer deposited at a higher temperature; the inability to use solder to make magnetic elements for electromagnetic actuators; mechanical weakness; brittleness common in Bi-based solders; significant electromigration risk; mutual adhesion of molten solder to polymer; and throughput (polymer and metal dispensed from separate nozzles). Others have demonstrated simple electromechanical/electronic devices fabricated by AM including relays, timing circuits using integrated circuits added manually, and flashlights [Periard et al., 2007; Malone and Lipson, 2007; Alonso et al., 2009; Malone and Lipson, 2008]. For example, a solenoid was fabricated using solder for coils, silicone for dielectric, and iron powder in grease for a core [Alonso et al., 2009]. While useful as a demonstration, the process was cumbersome and not fully-automated. Stratasys and Optomec (Albuquerque, N. Mex.) have demonstrated fabricating structures in rigid polymer using FDM and depositing traces of silver nanoparticle ink using aerosol jetting [O'Reilly and Leal, 2010]. Trace resistivity can be as low as $1\times10^{-5}$ ohm-cm, but part surface roughness and the need to sinter the ink remain challenges. Similar work has been done by researchers using stereolithography and micro-dispensing pumps [Lopes et al., 2012]. In both these efforts, traces are necessarily confined to external surfaces unless channels are manually filled by pumping [DeNava et al., 2008]; therefore circuitry is not truly 3-D and solenoid-type coils seem impossible. Moreover, these processes are not integrated or fully-automated. Others have postulated the use of curved layers to produce integrated electromechanical structures using FDM, insisting incorrectly that circuits cannot be produced using planar processes due to inter-layer connectivity issues [Diegel et al., 2011]. Curved layers introduce many difficulties and in any case do not truly obviate the need for a solution to interlayer connectivity.

Wire embedding AM: A student project called "SpoolHead" investigated the use of FDM and wire to make 3-D circuits [Bayless et al., 2010], inspired by an adhesive-coated wire-based AM method [Lipsker, 2000]. Earlier work [e.g., Rabinovich, 1996] explored generating 3-D structures using laser welding of flat-sided wire. SpoolHead aimed to deposit thermoplastic using FDM, then interrupt the process and lay down wire while attempting to secure it to the polymer by remelting.

Elastomer AM: Additive manufacturing with elastomer materials is currently available. Polyjet can print with elastomeric photopolymer, and 3D Systems' (Rock Hill, S.C.) selective laser sintering process can work with powdered elastomer. Both techniques produce rather fragile parts, and neither is capable of selectively incorporating conductive materials. Elastomers have been cast and combined with other materials using a subtractive/additive process [Cutkosky and Kim, 2009]. Of most relevance, FDM of thermoplastic elastomers was demonstrated at Virginia Tech [Elkins et al., 1997] by changing the design of a standard FDM printhead to reduce the risk of filament buckling and to optimize filament feed rollers. Also, Stratasys commercialized for some time an elastomer FDM material.

Molded Interconnect Device: Molded interconnect device (MID) is a device produced via injection molding of thermoplastic and having circuitry integrated into the device. The process is limited to locating circuit elements on the surface of the device; they cannot be located internally, so it would, for example, be impossible to produce a multi-layer, 3-D coil. Moreover, MID conductors tend to be thin and not capable of carrying higher currents.

SUMMARY OF THE INVENTION

The present invention a multi-material additive manufacturing process comprising: extruding an extrudable material through a nozzle capable of moving along one or more axis and concurrently extruding one or more filaments, wherein the filament is embedded in or on extrudate from the nozzle. In one aspect, the filament is extruded nominally coaxial with the thermoplastic material. In another aspect, the filament is a metal, a semiconductor, a ceramic, a conductor, a conductive polymer, a magnetic material, a conductive powder, a fiber, an optical fiber, a tube, or a conductive thermoplastic polymer. In another aspect, one or more filaments are wound into coils, formed into a block, formed into a cylinder or other shapes to form one or more actuators, sensors, thermal management structures, switches, transformers, fuses, resistors, capacitors, inductors, antennae, batteries, external connecting pads, variable-resistance resistors, force sensors, pressure sensors, temperature sensors, cores and armatures for electromagnetic devices, capacitor plates, heat sinks, solenoids, heat conduction structures or power supplies. In another aspect, two or more filaments are formed into one or more mechanotronic structures. In another aspect, the extrudable material is a thermoplastic material, a dielectric material, an elastomeric material, or a deformable material. In another aspect, the one or more filaments are connected electrically by a metal, a semiconductor, a ceramic, a conductor, a conductive polymer, a conductive powder, or a conductive thermoplastic polymer. In another aspect, the process further comprises the step of connecting one or more integrated circuits, actuators, sensors, thermal management structures, switches, transformers, fuses, resistors, capacitors, inductors, antennae, batteries, external connecting pads or power supplies to the one or more filaments. In another aspect, the one or more filaments are defined further as one or more sacrificial filaments that when removed create one or more open conduits or vias. In another aspect, wherein the one or more filaments are surrounded by a dielectric and the dielectric is removable by at least one method selected from laser processing, heating, mechanical stripping, or plasma etching. In another aspect, the one or more filaments are joined by welding, soldering, brazing, ultrasonic/thermosonic bonding, crimping, winding, pressure contact, or mutual entanglement. In another aspect, the process further comprises the step of cutting the one or more filaments upon deposition. In another aspect, the process further comprises a computer that controls the steps of extruding the thermoplastic material and the one or more filaments.

Another embodiment of the present invention includes a system for a multimaterial additive manufacturing process comprising: a first nozzle for extruding an extrudable material through a nozzle capable of moving along one or more axis; and a filament dispenser that concurrently extrudes one or more filaments, wherein the filament is embedded in or on extrudate from the nozzle. In one aspect, the filament is extruded nominally coaxial with the thermoplastic material. In another aspect, the filament is a metal, a semiconductor, a ceramic, a conductor, a conductive polymer, a magnetic material, a conductive powder, a fiber, an optical fiber, a tube, or a conductive thermoplastic polymer. In another aspect, the one or more filaments are wound into coils, formed into a block, formed into a cylinder or other shapes to form one or more actuators, sensors, thermal management structures, switches, transformers, fuses, resistors, capacitors, inductors, antennae, batteries, external connecting pads, variable-resistance resistors, force sensors, pressure sensors, temperature sensors, cores and armatures for electromagnetic devices, capacitor plates, heat sinks, solenoids, heat conduction structures or power supplies. In another aspect, the two or more filaments are formed into one or more mechanotronic structures. In another aspect, the extrudable material is a thermoplastic material, a dielectric material, an elastomeric material, or a deformable material. In another aspect, the one or more filaments are connected electrically by a metal, a semiconductor, a ceramic, a conductor, a conductive polymer, a conductive powder, or a conductive thermoplastic polymer. In another aspect, one or more integrated circuits, actuators, sensors, thermal management structures, switches, transformers, fuses, resistors, capacitors, inductors, antennae, batteries, external connecting pads or power supplies, to the one or more filaments. In another aspect, the one or more filaments are defined further as one or more sacrificial filaments that when removed create one or more open conduits or vias. In another aspect, wherein the one or more filaments are surrounded by a dielectric and the dielectric is removable by at least one method selected from laser processing, heating, mechanical stripping, or plasma etching. In another aspect, the one or more filaments are joined by welding, soldering, brazing, ultrasonic/thermosonic bonding, crimping, winding, pressure contact, or mutual entanglement. In another aspect, the system further comprises a cutter capable of cutting the one or more filaments upon deposition. In another aspect, the system further comprises a computer that controls the steps of extruding the thermoplastic material and the one or more filaments.

Yet another embodiment of the invention include an apparatus for a multimaterial additive manufacturing process comprising: a first nozzle for extruding a thermoplastic material through a nozzle capable of moving along one or more axis; and a filament dispenser that concurrently extrudes one or more filaments, wherein the filament is embedded is embedded in or on extrudate from the nozzle. In one aspect, the filament is extruded nominally coaxial with the thermoplastic material. In another aspect, the filament is a metal, a semiconductor, a ceramic, a conductor, a conductive polymer, a magnetic material, a conductive powder, a fiber, an optical fiber, a tube, or a conductive thermoplastic polymer. In another aspect, the one or more filaments are wound into coils, formed into a block, formed into a cylinder or other shapes to form one or more actuators, sensors, thermal management structures, switches, transformers, fuses, resistors, capacitors, inductors, antennae, batteries, external connecting pads, variable-resistance resistors, force sensors, pressure sensors, temperature sensors, cores and armatures for electromagnetic devices, capacitor plates, heat sinks, solenoids, heat conduction structures or power supplies. In another aspect, the two or more filaments are formed into one or more mechanotronic structures. In another aspect, the extrudable material is a thermoplastic material, a dielectric material, an elastomeric material, or a deformable material. In another aspect, the one or more filaments are connected electrically by a metal, a semiconductor, a ceramic, a conductor, a conductive polymer, a conductive powder, or a conductive thermoplastic polymer. In another aspect, one or more integrated circuits, actuators, sensors, thermal management structures, switches, transformers, fuses, resistors, capacitors, inductors, antennae, batteries, external connecting pads or power supplies, to the one or more filaments. In another aspect, the one or more filaments are defined further as one or more sacrificial filaments that when removed create one or more open conduits or vias. In another aspect, wherein the one or more filaments are surrounded by a dielectric and the dielectric is removable by at least one method selected from laser processing, heating, mechanical stripping, or plasma etching. In another aspect, the one or more filaments are joined by welding, soldering, brazing, ultrasonic/thermosonic bonding, crimping, winding, pressure contact, or mutual entanglement. In another aspect, the apparatus further comprises a cutter capable of cutting the one or more filaments upon deposition. In another aspect, the apparatus further comprises a computer that controls the steps of extruding the thermoplastic material and the one or more filaments.

Thus, 3-D Polymer+Wire Printing (3dPWP) process, system, and apparatus of the present invention provides a truly multi-material Additive Manufacturing (AM) process that can fabricate functional electromechanical devices. 3dPWP greatly extends AM to enable automated fabrication of multi-material, multi-functional components and devices having embedded 3-D circuitry, actuators, sensors (e.g. accelerometers, strain gauges, tactile arrays, and touch screen overlays), thermal management structures (e.g., heat sinks and pipes), switches, transformers, fuses, resistors, capacitors, inductors, and antennae, among other elements.

The potential impact of 3dPWP is in providing a new means of monolithically producing fully-customized functional components and systems without the need for assembly, directly from digital data. In the semiconductor industry, monolithic fabrication has made possible the integrated circuit. At the macro scale—and incorporating mechanical, not just electrical elements—monolithic fabrication can also have a huge benefit, reducing cost while increasing reliability and quality, and enabling products impossible with traditional approaches.

The methods and apparatus of 3dPWP incorporate materials such as metal wire and conductive composites into a polymer matrix as a structure or device is built up, one layer at a time. More specifically, 3dPWP provides for simultaneous deposition of conductive and ferromagnetic wires together with polymer: either a pure polymer (e.g., an elastomer) or an electrically conductive polymer composite (ECPC) composed of polymer and conductive filler particles. The ability to controllably deposit these three materials provides enormous flexibility in creating mechatronic structures with embedded electromagnetic elements.

The present invention provides a multi-material additive manufacturing process, system, and apparatus for fabricating 3-D structures, devices, components, systems, products, and assemblies comprising polymer and wire, and in some embodiment variations, also conductive polymer composite. Such fabricated objects are generally active, in the sense of incorporating circuitry, actuators, and/or sensors, and can be used in robotics, defense systems, medical devices, consumer electronics, and many other fields.

The present invention provides a process, system, and apparatus for fabricating a 3-D structure, device, component, system, product, or assembly using a layer-by-layer, additive manufacturing process wherein an extrudate that forms at least a portion of a layer comprises a matrix (i.e., structural, build, or model) material and an embedded wire, fiber, or fluid conduit (hereinafter "fiber") whose major axis is substantially parallel to that of the extrudate.

The present invention provides a process, system, and apparatus for fabricating a 3-D structure, device, component, system, product, or assembly using a layer-by-layer, additive manufacturing process wherein an extrudate that forms at least a portion of a layer comprises a dielectric matrix material and an embedded metallic wire whose major axis is substantially parallel to that of the extrudate.

The present invention provides a process, system, and apparatus for fabricating a 3-D structure, device, component, system, product, or assembly using a layer-by-layer, additive manufacturing process wherein a matrix and a fiber are co-deposited, resulting in a fiber embedded in a matrix.

The present invention provides a process, system, and apparatus for fabricating a 3-D structure, device, component, system, product, or assembly using a layer-by-layer, additive manufacturing process wherein a fiber embedded in a matrix and forming at least a portion of a layer is in some embodiment variations joined electrically, mechanically, or both to other fibers in the same or a different layer.

The present invention provides a process, system, and apparatus for fabricating a 3-D structure, device, component, system, product, or assembly using a layer-by-layer, additive manufacturing process wherein in some embodiment variations a metallic wire, embedded in a conductive matrix and forming at least a portion of a layer, is electrically connected to other metallic wires in the same or a different layer through the conductive matrix.

The present invention provides a process, system, and apparatus for fabricating a 3-D structure, device, component, system, product, or assembly using a layer-by-layer, additive manufacturing process wherein in some embodiment variations a metallic wire embedded in a conductive matrix and forming at least a portion of a layer is electrically connected to other metallic wires in the same or a different layer through the conductive matrix and the conductive matrix comprises a polymer and conductive particles.

The present invention provides a process, system, and apparatus for fabricating a 3-D structure, device, component, system, product, or assembly using a layer-by-layer, additive manufacturing process wherein in some embodiment variations a conductive matrix comprising a polymer includes conductive particles at a concentration above the percolation threshold such that some contamination by dielectric material will not significantly lower conductance, and wherein some contamination of dielectric material by conductive particles will not render the dielectric material conductive.

The present invention provides a process, system, and apparatus for fabricating a 3-D structure, device, component, system, product, or assembly using a layer-by-layer, additive manufacturing process wherein in some embodiment variations metallic wires are joined by welding, soldering, brazing, ultrasonic/thermosonic bonding, crimping, winding, pressure contact, or mutual entanglement.

The present invention provides a process, system, and apparatus for fabricating a 3-D structure, device, component, system, product, or assembly using a layer-by-layer, additive manufacturing process wherein in some embodiment variations a fiber surrounded by an initially fluid matrix material is co-deposited with the matrix material to form at least a portion of a layer and wherein the fiber is redirected during deposition such that its major axis is substantially parallel to that of the extrudate by the time the matrix material has solidified.

The present invention provides a process, system, and apparatus for fabricating a 3-D structure, device, component, system, product, or assembly using a layer-by-layer, additive manufacturing process including an embedded filament wherein in some embodiment variations actuators, sensors, and/or wiring are monolithically fabricated.

The present invention provides a process, system, and apparatus for fabricating a 3-D structure, device, component, system, product, or assembly having such elements as embedded 3-D circuitry, actuators, sensors, thermal management structures, switches, transformers, fuses, resistors, capacitors, inductors, and antennae using a multi-material, multi-functional layer-by-layer, additive manufacturing process.

The present invention provides a process, system, and apparatus for fabricating a 3-D structure, device, component, system, product, or assembly using a layer-by-layer, additive manufacturing process wherein in some embodiment variations an embedded metallic wire is mechanically soft and in some embodiment variations annealed.

The present invention provides a process, system, and apparatus for fabricating a 3-D structure, device, component, system, product, or assembly using a layer-by-layer, additive manufacturing process wherein an embedded metallic wire is in some embodiment variations circular in cross section.

The present invention provides a process, system, and apparatus for fabricating a 3-D structure, device, component, system, product, or assembly using a layer-by-layer, additive manufacturing process wherein an embedded metallic wire is in some embodiment variations rectangular or square in cross section.

The present invention provides a process, system, and apparatus for fabricating a 3-D structure, device, component, system, product, or assembly using a layer-by-layer, additive manufacturing process wherein in some embodiment variations a matrix and a fiber are co-deposited along a curved path and a spool or other fiber storage means is rotated to counteract torsion resulting from such deposition.

The present invention provides a process, system, and apparatus for fabricating a 3-D structure, device, component, system, product, or assembly using a layer-by-layer, additive manufacturing process wherein in some embodiment variations a matrix and a fiber are co-deposited along a curved path and the direction of the deposition is alternated between clockwise and counterclockwise to counteract torsion resulting from such deposition.

The present invention provides a process, system, and apparatus for fabricating a 3-D structure, device, component, system, product, or assembly using a layer-by-layer, additive manufacturing process wherein in some embodiment variations a deposition head comprises at least one flow channel for matrix material and at least one capillary for filament dispensing.

The present invention provides a process, system, and apparatus for fabricating a 3-D structure, device, component, system, product, or assembly using a layer-by-layer, additive manufacturing process wherein in some embodiment variations a deposition head comprises at least one flow channel for dielectric material and at least one flow channel for conductive material.

The present invention provides a process, system, and apparatus for fabricating a 3-D structure, device, component, system, product, or assembly using a layer-by-layer, additive manufacturing process wherein in some embodiment variations a deposition head comprises a flow channel for fluid and a capillary with suitable geometry to substantially displace and purge fluid from the flow channel when maneuvered within the flow channel.

The present invention provides a process, system, and apparatus for fabricating a 3-D structure, device, component, system, product, or assembly using a layer-by-layer, additive manufacturing process wherein in some embodiment variations a deposition head comprises a clamp to securely hold filament and wherein the clamp is fixed to a capillary and actuated by translating the capillary.

The present invention provides a process, system, and apparatus for fabricating a 3-D structure, device, component, system, product, or assembly using a layer-by-layer, additive manufacturing process wherein in some embodiment variations a deposition head comprises a cutter to cut filament and wherein the cutter is fixed to a capillary and actuated by translating the capillary.

The present invention provides a process, system, and apparatus for fabricating a 3-D structure, device, component, system, product, or assembly using a layer-by-layer, additive manufacturing process wherein in some embodiment variations filament is dispensed or fed from a deposition head by vibration.

The present invention provides a process, system, and apparatus for fabricating a 3-D structure, device, component, system, product, or assembly using a layer-by-layer, additive manufacturing process wherein in some embodiment variations filament is dispensed or fed from a deposition head by anchoring the wire in substantially solidified matrix material and pulling it through the deposition head.

The present invention provides a process, system, and apparatus for fabricating a 3-D structure, device, component, system, product, or assembly using a layer-by-layer, additive manufacturing process wherein in some embodiment variations filament is cut or terminated by sudden tension, twisting, or cyclic motion inducing mechanical fatigue.

The present invention provides a process, system, and apparatus for fabricating a 3-D structure, device, component, system, product, or assembly using a layer-by-layer, additive manufacturing process wherein in some embodiment variations filament passes through a capillary or other sheath and matrix material is removed from the region of the filament exiting the capillary to prevent the filament from being coated with matrix material.

The present invention provides a process, system, and apparatus for fabricating a 3-D structure, device, component, system, product, or assembly using a layer-by-layer, additive manufacturing process wherein in some embodiment variations matrix material coating a filament is removed by methods including laser processing, heating, mechanical stripping, and plasma etching.

The present invention provides a process, system, and apparatus for fabricating a 3-D structure, device, component, system, product, or assembly using a layer-by-layer, additive manufacturing process wherein in some embodiment variations filament position within the extrudate along the deposition (e.g., vertical) axis is controlled by adjusting capillary height and/or filament feed rate and in some embodiment variations filament position is controlled in a closed-loop fashion based on sensing the filament position within the extrudate.

It is the object of some aspects of the invention to provide a process, system, and apparatus for fabricating a 3-D structure, device, component, system, product, or assembly using a layer-by-layer, additive manufacturing process wherein in some embodiment variations filament position within curved extrudate in the layer plane (e.g., horizontal) is controlled by adjusting capillary rotation angle and/or printhead speed.

The present invention provides a process, system, and apparatus for fabricating a 3-D structure, device, component, system, product, or assembly using a layer-by-layer, additive manufacturing process wherein in some embodiment variations toolpaths for the deposition head are determined such that paths which include embedded filament are preferentially routed and those which do not include filament are routed at a lower priority.

The present invention provides a process, system, and apparatus for fabricating a 3-D structure, device, component, system, product, or assembly using a layer-by-layer, additive manufacturing process wherein separately-manufactured components are incorporated during fabrication process using pick-and-place or other means.

The present invention provides a process, system, and apparatus for fabricating a 3-D structure, device, component, system, product, or assembly using a layer-by-layer, additive manufacturing process wherein a removable and preferably soluble support material is provided and at least some of the support material is substantially encapsulated in matrix material to allow retention of at least some of the support material in the final structure, device, component, system, product, or assembly.

The present invention provides a process, system, and apparatus for fabricating a 3-D structure, device, component, system, product, or assembly using a layer-by-layer, additive manufacturing process wherein a conductive matrix comprising a polymer and conductive particles is used in the formation of integrated elements such as variable-resistance resistors, force sensors, pressure sensors, temperature sensors, cores and armatures for electromagnetic devices, capacitor plates, heat sinks, and other heat conduction structures.

The present invention provides a process, system, and apparatus for fabricating a 3-D structure, device, component, system, product, or assembly using a layer-by-layer, additive manufacturing process wherein the structure, device, component, system, product, or assembly comprises voids, which are fluid-filled and in some embodiment variations interconnected.

The present invention provides a process, system, and apparatus for fabricating a 3-D structure, device, component, system, product, or assembly using a layer-by-layer, additive manufacturing process wherein solenoid actuators are joined in series, in parallel, or in a combination of series and parallel.

The present invention provides a process, system, and apparatus for fabricating a coil from smaller coils arranged parallel to one another and electrically wired in parallel to one another.

Various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all embodiments be addressed by any single aspect of the invention, even though that may be the case with regard to some aspects. Other aspects of the invention may involve combinations of the above noted aspects of the invention. These other aspects of the invention may provide various combinations of the aspects presented above as well as provide other configurations, structures, functional relationships, and processes that have not been specifically set forth herein.

Another application for 3dPWP is in robotics, including soft (i.e., compliant) robots. Traditional robotic systems have rigid elements with rotary joints and localized actuation. A new class of soft robotic systems is rapidly emerging, driven by a number of performance and application requirements. The intrinsic compliance of soft robots provides advantages for reliable grasping and manipulation of delicate, flexible, and irregular objects (e.g., tools) and is more suitable for working in close proximity to people. A key challenge of soft robots is being able to practically manufacture robot components having both distributed actuation—soft robots intrinsically have a large number of degrees of freedom—and broad-area touch sensing. 3dPWP allows for automated, custom, rapid, low-cost fabrication without assembly of entire, functional robots and robot subsystems: the unprecedented capability to literally print robots. Ultimately, the embedding of integrated circuits (microcontrollers, memory, optoelectronics, etc.) and MEMS devices needed in robotic systems can provide even greater functionality.

3dPWP is also applicable to many other fields including highly dexterous, lifelike prosthetics; minimally-invasive surgical instruments; microfluidic devices with built-in pumps; bespoke wearable electronics with integrated physiological sensors and communications; and small UAVs with built-in radar and shape-morphing wings, to name a few. Moreover, the invention represents a revolutionary packaging approach that can liberate electronic products from the printed circuit board and offer new, flexible, organic, customizable 3-D form factors in which product and circuit become one and multiple levels of conventional packaging are eliminated, reducing size, weight, and cost while boosting reliability. In addition to wires providing electrical and magnetic properties, other fibrous elements such as fluidic channels and optical fibers can be incorporated into polymer structures fabricated according to the invention.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
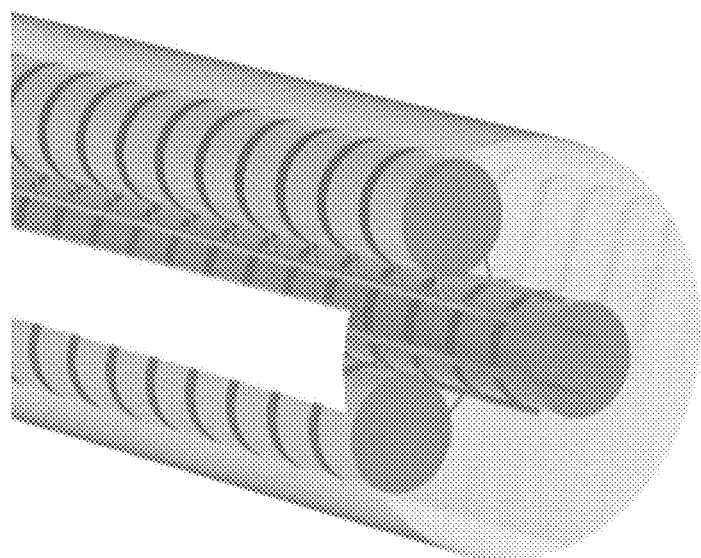
FIG. 1 depicts a robot limb with distributed, wired actuators and sensors, able to bend and change length.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

AM (Additive Manufacturing, a.k.a., 3-D Printing) is a proven approach to rapid, layer-by-layer fabrication of complex 3-D parts with internal features, and mechanical devices with multiple moving parts requiring no assembly. The present invention is intended to achieve a "holy grail" of AM: namely, to provide a truly multi-material AM process that can fabricate functional electromechanical devices. The invention would great extend AM to enable automated fabrication of multi-material, multi-functional components and devices having embedded actuators, sensors, 3-D circuitry, and elements such as resistors, capacitors, inductors, and antennae.

The potential impact of the invention is in providing a new means of monolithically producing fully-customized functional components and systems without the need for assembly, directly from digital data. In the semiconductor industry, monolithic fabrication has made possible the integrated circuit. At the macro scale—and incorporating mechanical, not just electrical elements—monolithic fabrication can also have a huge benefit, reducing cost while increasing reliability and quality, and enabling products impossible with traditional approaches. The methods and apparatus of the invention incorporate materials such as metal wire and conductive composites into a polymer matrix as a structure or device is built up, one layer at a time. More specifically, it provides for simultaneous deposition of conductive and ferromagnetic wires together with polymer: either a pure polymer (e.g., an elastomer) or an electrically conductive polymer composite (ECPC) composed of polymer and conductive filler particles. The ability to controllably deposit these three materials provides enormous flexibility in creating mechatronic structures with embedded electromagnetic elements.

A key application is in robotics, including soft (i.e., compliant) robots. Traditional robotic systems have rigid elements with rotary joints and localized actuation. A new class of soft robotic systems is rapidly emerging, driven by a number of performance and application requirements. The intrinsic compliance of soft robots provides advantages for reliable grasping and manipulation of delicate, flexible, and irregular objects (e.g., tools) and is more suitable for working in close proximity to people. A key challenge of soft robots is being able to practically manufacture robot components having both distributed actuation—soft robots intrinsically have a large number of degrees of freedom—and broad-area touch sensing. Indeed, the 2009 Roadmap for U.S. Robotics calls for "embedded sensors and actuators in soft materials for robot limbs and bodies" in 10 years to address this challenge. The invention allows for automated, custom, rapid, low-cost fabrication without assembly of entire, functional robots and robot subsystems: the unprecedented capability to literally print robots. Ultimately, the embedding of integrated circuits (microcontrollers, memory, optoelectronics, etc.) and MEMS devices needed in robotic systems can provide even greater functionality.

The invention is also applicable to many other fields including highly dexterous, lifelike prosthetics; minimally-invasive surgical instruments; microfluidic devices with built-in pumps; bespoke wearable electronics with integrated physiological sensors and communications; and small UAVs with built-in radar and shape-morphing wings, to name a few. Moreover, the invention represents a revolutionary packaging approach that can liberate electronic products from the printed circuit board and offer new, flexible, biologically-inspired, customizable 3-D form factors in which product and circuit become one and multiple levels of conventional packaging are eliminated, reducing size, weight, and cost while boosting reliability. In addition to wires providing electrical and magnetic properties, other fibrous elements such as fluidic channels and optical fibers can be incorporated into polymer structures fabricated according to the invention.

To date, most robotic systems are comprised of substantially rigid members with rotational joints. A new class of soft robotic systems is rapidly emerging, driven by new performance and application requirements. Due to their intrinsic compliance, soft robots can be more suitable than rigid ones to work safely and collaboratively with people. Reliable grasping and manipulation of delicate, flexible, and irregular objects found often in the real world (e.g., fruit on a tree) without damage has proven challenging to rigid robots; soft robots promise a more natural and potentially simpler solution to these problems. Unlike a rigid robot, a soft robot might be able to contort and contract itself to wriggle through narrow openings, as might be needed for search and rescue or soldier-assist. Moreover, soft robots can exploit biomimetic and previously-unavailable modes of locomotion, such as the peristaltic motion of a worm [Seok et al., in publication], enabling navigation through small passageways or irregular terrain. Lastly, soft robots can have deformable "skins", enabling broad-area tactile sensing.

Unlike the SpoolHead system described hereinabove, the 3dPWP of the present invention can achieve the same results as SpoolHead, but solves a number of fundamental problems including 1) difficulty of bonding wire securely to polymer (required for self-feeding of wire and making sharp turns), 2) throughput, and 3) lack of a viable solution to intra- or inter-layer interconnects. In addition, SpoolHead would have trouble completely encapsulating wire and spacing wires closely without shorting. These limitations render SpoolHead impractical; 3dPWP is far more practical, versatile, and reliable.

To take full advantage of the flexibility offered by soft robots requires the integration of sensing and actuation elements and circuitry/electrical wiring directly into the robot structure (e.g., FIG. 1). Indeed, in the extreme case of a robotic limb without any rigid support (e.g., a tentacle), distributed actuation must be integrated into the element during fabrication (similar to the muscles in squid tentacles) for the device to function at all. To address these challenges, the invention (hereinafter "3dPWP", an acronym for "3-D Polymer+Wire Printing") provides a new multi-material Additive Manufacturing (AM, a.k.a 3-D printing) method for rapidly, economically, automatically, and flexibly manufacturing complex 3-D structures, devices, components, systems, products, and assemblies. Among the systems that can be fabricated using 3dPWP are soft robot components with embedded, distributed actuation, sensing, and circuitry, produced without the need for assembly. 3dPWP generates active electromechanical structures, is driven directly by computer aided design (CAD) data, requires no tooling, and uses low-cost materials. 3dPWP enables complex geometries as well as distributed elements and material combinations and arrangements that in many cases are impossible to produce using the prior art. 3dPWP can print standalone mechatronic devices, robot parts, integrated subsystems, entire robots, packaging systems, and entire electronic devices.

3dPWP fabricates components in layers by extruding dielectric and conductive polymer along with an embedded wire core. The ability to create heterogeneous structures using both dielectric and electromagnetic materials in an AM processes allows for monolithic fabrication of actuators and sensors embedded within the structure being fabricated. The result is a "smart", multifunctional, active material that can dynamically modulate its shape and sense its environment. With 3dPWP, actuators and sensors can be distributed throughout the volume of the fabricated device, located virtually anywhere and built in virtually any shape.

AM (Additive Manufacturing, a.k.a., 3-D Printing) is a proven approach to rapid, layer-by-layer fabrication of complex 3-D parts with internal features, and mechanical devices with multiple moving parts requiring no assembly. Additive Manufacturing typically produces prototypes, production parts, and tooling directly from raw materials based on CAD models by depositing successive layers of material (e.g., polymer or metal) to build up a 3-D structure. Since there is full access to both internal and exterior regions as layers are formed, AM can make products otherwise impossible to manufacturable. AM can make parts in mere hours using a compact, self-contained machine. It usually requires no molds, patterns, or masks, produces little waste, often yields ready-to-use products, and allows an unlimited degree of customization at no additional cost. Nonetheless, AM has achieved only a fraction of its potential. In particular, current processes are unable to produce functional mechatronic devices since AM uses homogeneous materials, whereas mechatronic devices must contain elements that are dielectric, conductive, and often, magnetic.

3dPWP is based on the Fused Deposition Modeling (FDM) process introduced by Stratasys (Eden Prairie, Minn.). In FDM, a thermoplastic polymer filament is fed by rollers into the liquefier of a printhead where it is melted and extruded from a nozzle. The head moves according to an X/Y toolpath under computer control, based on the calculated cross-section of the structure to be fabricated, laying down polymer extrudates that form the perimeter, top and bottom surfaces, and interior "fill" of a layer. FDM has several primary benefits: 1) fabrication using robust engineering polymers, 2) low cost, and 3) ability to produce multiple-component assemblies of moving parts.

3dPWP greatly extends FDM, integrating the deposition of conductive wire (or other material in filament/elongated form, hereinafter "wire") into the process. In some embodiment variations, the wire is ferromagnetic, e.g., to allow for fabrication of elements of electromagnetic devices. In some embodiment variations, 3dPWP also integrates metal particle-filled polymer composite into the FDM process.

3dPWP allows, for example, the fabrication of robot limbs with built-in, distributed actuators (electromagnetic, capacitive, etc.) and a full-surface tactile sensing "skin". Such a limb can support a multi-fingered hand—also built with 3dPWP—that manipulates objects; meanwhile, four such limbs can serve as robot legs. 3dPWP can produce worm- and snake-like robots that move like their biological cousins, swimming robots, shape-changing robots, and other novel configurations. Affordable, patient-unique disposable surgical and interventional robots with many degrees of freedom that allow access to deep brain tumors through a small incision are also enabled by 3dPWP.

3dPWP enables robot components to be produced in hours. Custom, application-specific component designs in 3-D CAD are manufacturable without tooling, using an automated machine, and from low-cost materials.

Robots are typically assembled from discretely-manufactured and packaged components that require interconnection and are often costly and bulky. Therefore is it normally impractical to incorporate a large number of actuators and sensors. Monolithic fabrication of components and wiring using 3dPWP allows 10s-100s of actuators and sensors to be "built in" to robot body structures as they are made. Distributed actuation enables more degrees of freedom [Walker et al., 2005], increased dexterity, more complex motions (e.g., facial expressions for humanoids [Tadesse et al., 2011], new modes of locomotion, adaptive and shape-changing structures, dynamically-tunable stiffness, and redundancy. It allows large displacements and large forces to be generated from short-stroke and small actuators, respectively. Moreover, the ability to locate an actuator close to the point of action frees up "real estate" otherwise occupied by linkages, cables, etc.

With regard to sensing, the ability to build a component with sensors distributed throughout (e.g., near the surface for tactile sensing) promises to imbue robots with high spatial resolution capabilities that begin to emulate living organisms. 3dPWP also enables complex 3-D wiring networks and dense connectors with dozens of I/O so that distributed elements can be connected and interfaced to controllers, power, etc.

With 3dPWP, actuators, sensors, and wiring—as well as any discrete devices incorporated while building—can be encapsulated by polymer at virtually no additional cost in material or processing time. As such they will be unable to delaminate and will be protected from hazards such as mechanical forces that can cause distortion or fracture, moisture, dust, EMI (via built-in Faraday cages), and corrosive fluids.

Thus, the present inventors have developed a novel 3dPWP that for the first time enables the additive manufacturing of multi-material, active structures and devices such as robots, which comprise 3-D electrical circuits, actuators, sensors, and other components. A key challenge in integrating distributed actuators and sensors throughout a robot body or component—as well as for other active devices—is providing electrically conductive pathways through a dielectric material. Common methods of achieving conductivity such as low-temperature solders and conductive inks have issues with high-temperature curing operations, adhesion with the polymer, throughput, limited geometries, and sophisticated equipment required to implement. In lieu of these approaches—and far more compatible with AM processes—is 3dPWP's use of conductive composites and fibrous conductors (i.e., wires).

Epoxy and silicone conductive adhesives are widely available, and thermoplastic conductive adhesives for flip chip applications are in use [Gilleo, 2000]. By adding conductive particles at sufficient concentration to thermoplastic it is possible to produce an electrically conductive polymer composite (ECPC). At low concentrations, the additive doesn't change the electrical properties of the polymer matrix significantly because the particles are dispersed and non-contacting. As the concentration increases, a sharp increase in conductivity is eventually achieved at the "percolation threshold", when enough particulate material is incorporated that conductive junctions are formed between neighboring particles/particulate agglomerates and conductive pathways are formed throughout the composite matrix [Aneli et al., 2012; Huang, 2002]. Further increases in the concentration of particulate above the threshold will increase bulk conductivity, but at a much lower rate.

Conductive particles useful in 3dPWP include those comprised of nickel, silver, gold, carbon, and copper. Such particles can have multiple forms, e.g., solid metal, metal-coated polymer, and metal-coated glass. Particles may be micro-scale (e.g., average sizes in the range of 5-50 µm) or nano-scale (e.g., average sizes <1 µm).

If the polymer is an elastomer (e.g., for a soft robot), then addition of particulate to the matrix generally would make the material stiffer and more brittle as particulate concentration is increased. Moreover, the conductivity of ECPC is far lower than that of the pure additive material (typically by a factor of 103-108) due mostly to lowered conductive area and inter-particle electrical resistance [Ruschau et al., 1992]. Even some of the highest-conductivity ECPC adhesives (e.g. SEC1244 (Resinlab, Germantown, Wis.): resistivity ~6×10$^{-4}$ ohm-cm) are over 200 times less conductive than annealed Cu. Hence, use of ECPC for creating long conductive pathways would introduce excessive electrical losses and associated heating, as well as potentially degrading the mechanical properties of the elastic structure. Instead, 3dPWP uses metallic wires embedded (e.g., coaxially) within the polymer (creating a "coaxial composite") for the majority of the conductive pathways, limiting, in some embodiment variations, the use of ECPCs to creating electrical junctions.

To form 3-D structures from a plurality of polymer extrudates with metal wire embedded substantially coaxially in selected regions, and (in some embodiment variations) to use ECPC to form electrical junctions, 3dPWP combines several key technologies: 1) FDM using thermoplastic polymers or other solidifiable materials such as thermoset polymers; 2) crosshead extrusion for wire coating; 3) ECPCs. In the case of 3dPWP fabricating soft structures, thermoplastic or thermoset elastomers are used as the solidifiable material.

In addition to the advantages mentioned above, FDM has the ability to use a range of thermoplastic materials, uses a vector deposition approach (vs. raster) that is intrinsically more compatible with incorporation of wire, and can include voids in structures, which can be used to adjust modulus and other properties. However, compared with FDM, 3dPWP requires apparatus with a novel printhead, novel process, novel control software, and novel material supply.

Crosshead extrusion is the standard process for insulated wire production. Molten polymer from an extruder enters a side port while wire is fed perpendicularly through the head: the polymer envelopes the wire exiting from a capillary. Polymer and wire then pass through a die that establishes the outside diameter of the coated wire, and the polymer jacket is allowed to solidify [Drobny, 2011].

While ECPCs are at present a poor choice for general wiring due to the long conductive pathways often required, in some embodiment variations they are highly advantageous for creating electrical junctions. To produce 3-D devices and provide power and signal paths to embedded components, electrical junctions are in general needed both between wires within the same layer and between wires in adjacent layers. A number of methods are available to create such junctions. In some embodiment variations, wires may be brought closely together and soldered or brazed. In other embodiment variations, wires may be pressed together and ultrasonically or thermosonically bonded. In yet other embodiment variations, wires may be welded (e.g., by laser welding or resistive welding). In yet other embodiment variations, wire may be simply mechanically placed into contact with other wire, crimp other wire, or be wound around or entangled with other wire, to form a junction that remains robustly conductive due to the wires being "potted" in surrounding polymer. Or, a "free air ball" (FAB) may be formed on the wire, e.g., using a variant of "electronic flame-off, a spark technique used in semiconductor ball bonders [Harman 1997], such that the FAB occupies the full width and/or height of the extrudate; this could make contact with a FAB in an adjacent extrudate, forming a junction.

Because it doesn't require contact pressure between wires or accurate alignment of wires, readily accommodates different sizes and cross-sectional shapes of wire, can produce multiple-layer/multiple-wire connections (by spanning the entire extrudate width and/or height), and can create junctions at any location along a wire (not merely at the ends), the use of ECPC to form junctions is in some embodiment variations particularly preferred. Moreover, ECPCs allow external components such as packaged ICs to be connected by pushing their leads through the ECPC (if the ECPC is soft enough, or the leads are heated), and enable magnetic cores and armatures (made from Ni wire and Ni powder-filled ECPC, or pure ECPC) and capacitor plates. Other elements which could be made using 3dPWP with the aid of deposited ECPC include variable-resistance resistors, force and pressure sensors, temperature sensors, heat sinks, heat pipes, and heat conduction structures.

Junctions can be formed by embedding wires in a matrix of deposited ECPC that establishes conductive pathways between them. While the resistivity of ECPCs is much higher than that of wire, the distance between wires in the junction is very short, so excellent junction resistance can in principal be obtained (e.g., ~0.1 ohm for a 1 mm-long junction with wires separated by 250 µm). Effective use of ECPC in 3dPWP requires judicious selection of particulate material, concentrations, and composite preparation. Percolation and conductivity in ECPCs has been studied extensively for different polymers and additives, with a focus on carbon black because of cost and the lack of an insulating oxide layer [Huang, 2002]. A number of factors can affect the percolation threshold in both hard polymers and elastomers, including the relative affinity of the particulate and polymer, shape and size of the particulate additive, and preparation of the composite material [Huang, 2002; Ruschau and Newnham, 1992; Kalyon et al., 2002; Bayer et al., 1988; Ezquerra et al., 1988]. Regarding composite preparation, degree of mixing and forming method (extrusion vs. compression molding) can have an important effect on percolation and conductive properties. A certain level of mixing is required to distribute the conductive filler throughout the matrix, but over-mixing can increase the minimum concentration of conductive additive required for percolation because the additive agglomerates are broken down and the particulates become spaced too far apart to form conductive chains without increasing concentration [Kalyon et al., 2002]. If the composites are injection molded, shear can redistribute the particles and break down agglomerates, affecting the conductive properties across high shear regions [Bayer et al., 1988; Ezquerra et al., 1988]. While general observations about electrical properties and basic mechanical properties (e.g., increased stiffness with higher solids loading) of ECPCs hold true for both hard polymers and elastomeric composites, composites based on elastomers present additional considerations. Even with the effect of particulate on mechanical properties, strains of several hundred percent are still achievable with typical conductive elastomeric composites, and filler content may have very little effect on elongation limit [Sau et al., 1997; Flandin et al., 2001]. With such large strains possible, however, the structure of the conductive chains in the composite can change during loading, causing changes in the electrical conductivity during strain, or even irreversible "de-percolation" if the strain becomes too large [Flandin et al., 2001; Li and Shimizu, 2009]. In some embodiment variations, junctions may be "shielded" from excessive loads that would compromise electrical behavior through proper design, incorporation of strong and rigid materials that handle the stress, etc. In some embodiment variations, the effect of strain on electrical conductivity may be mitigated by providing higher filler loading that improves electrical properties but may compromise mechanical properties, especially of elastomers. In any case, ECPC mechanical properties often will not dramatically influence overall structure behavior since ECPC is localized at junctions.

The polymer used to formulate ECPC may be the same polymer as that used to fabricate the object in general, or it may be a different polymer that is compatible (e.g., there is mutual adhesion and cross-contamination is not problematic). The conductive particulate additive may be a number of materials (e.g., silver, carbon black, nickel, silver-coated nickel) and range in size from nanoscale (sub 1 µm) to several microns or tens of microns. If a magnetic material such as Ni is used, the ECPC can be used to create structures such as cores/armatures for electromagnetic actuators and transformers. An example of an elastomer that may be used with 3dPWP is Chronoprene (AdvanSource Biomaterials, Wilmington, Mass.), which is available in a range of hardness, is highly elastic, has high abrasion resistance and durability, and is biocompatible (e.g. used in balloon catheters), making it suitable for medical devices.

Thermoplastic elastomers are well-suited as structural polymers for building soft robot components and bodies, as well as other structures and devices. Due to their compliance, elastomers can be more robust under impact and when subject to stress caused by differential thermal expansion between metal wire and polymer. Elastomers are soft enough to facilitate wire anchoring as will be described hereinafter, and also allow electrical components to be integrated into a device by pushing leads into regions of elastomer-based ECPC. Moreover, like all thermoplastics, they are recyclable. In the cases or locations where elastomers are too flexible or weak, strength and stiffness can be increased by incorporating reinforcing filaments/wires in the polymer matrix, or by integrating a strong and/or rigid material into the process. In some embodiment variations, a relatively strong, stiff, and preferably soluble support material—which may be similar in composition to materials commonly used for soluble supports in FDM (e.g., Lombardi et al. 2002; Priedeman, Jr. et al. 2004)—deposited along with the matrix material to provide support of the object during fabrication, may also be deposited and completely or substantially surrounded by matrix material (e.g., elastomer) such that it cannot be fully dissolved during the cleaning process used to remove support material that is exposed. Such encapsulated support material can thereby strengthen and stiffen the structural material, especially if it's an elastomer. Conversely, air or liquid-filled voids of various sizes and shapes can be introduced to reduce stiffness. If voids are interconnected through narrow air or liquid passages, then void volume and passage area can be specified so as to control the damping behavior of the structure as it flexes. In some embodiment variations, integrated filaments and relatively rigid material can be used to form structures that prevent excessive movement, much like ligaments in animal bodies. For example, a well-attached filament initially having a serpentine shape will limit movement when placed in tension once it has become straight.

Figure 2:
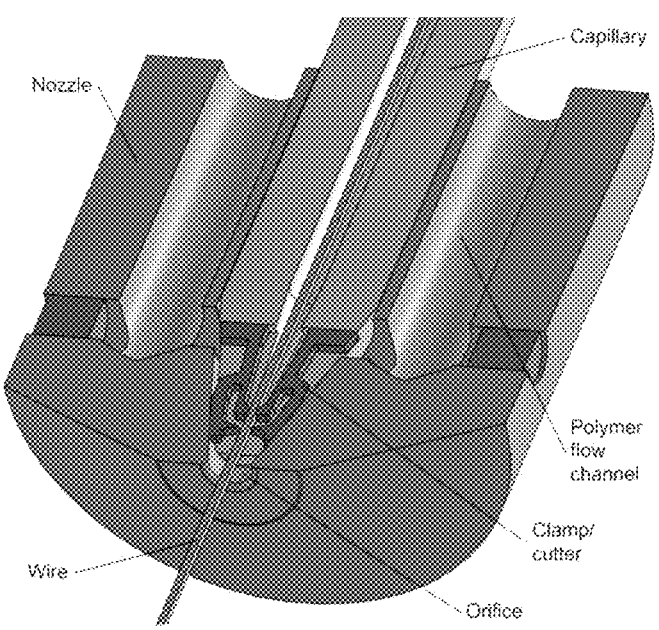
FIG. 2 depicts a 3dPWP printhead.

A 3dPWP printhead can include additional functionality compared to a standard FDM printhead, for example, the ability to: 1) cut wire; 2) in some embodiment variations, clamp wire; 3) switch between polymer and polymer with wire; 4) in some embodiment variations, switch from polymer with wire to bare wire; and 5) in some embodiment variations switch between extrusion of pure polymer and polymer-based ECPC. In some embodiment variations, ECPC is deposited by a separate printhead or separate nozzle, especially if the ECPC is not based on the matrix material or is less compatible with it. As shown in FIG. 2, a printhead capable of all of the above comprises an extrusion nozzle with two polymer flow channels and an orifice for extrusion; a slotted capillary through which wire is fed; and within the capillary slot, a pair of clamps/cutters. Not shown for simplicity are elements such as heated liquefiers located upstream of the flow channels, a nozzle heater, and in some embodiment variations two pairs of conductive feed rollers that advance the wire while heating it resistively and regulating wire tension. In some embodiment variations a key aspect of the printhead is the capillary through which the wire is fed. In some embodiment variations the capillary translates and in some embodiment variations the capillary also rotates about its long axis. The capillary may provide multiple functions: 1) clamping and cutting wire; 2) adjusting the position of wire within the extrudate in the plane formed by the orifice axis and the extrudate (e.g., a vertical plane); 3) purging the printhead when switching between elastomer and ECPC; 4) increasing control over the wire during winding operations (e.g., for solenoid cores); and 5) reducing polymer coating thickness (e.g., when producing coils).

In standard coated wire extrusion, the wire is kept centered with respect to the extrusion die orifice by a capillary until the polymer jacket solidifies, ensuring reasonable concentricity of wire and jacket. In 3dPWP, the capillary is typically vertical and the "jacketed wire" (i.e., polymer extrudate with wire core) is deposited parallel to the plane of the layers (see FIG. 5): typically horizontal. While molten polymer can easily negotiate this large (e.g., 90°) bend, the wire must be also be reoriented and bent. In some embodiment variations, the wire is gradually bent (to avoid kinks) and guided so as to be reasonably coaxial/concentric in the extrudate (excessive non-concentricity can lead to shorting between adjacent wires and other problems). In some embodiment variations, soft (e.g., annealed) wire is selected to facilitate bending in the vertical and horizontal planes. Concentricity is influenced by such parameters as wire stiffness, printhead speed, and viscosity and solidification rate of the molten polymer. For a given position of the printhead orifice above the building substrate/previous layer, the vertical concentricity of the wire is controlled, in some embodiment variations, by adjusting the internal capillary height, wire feed rate, and/or other parameters. In some embodiment variations, this adjustment is dynamic, based on factors (e.g., printhead speed) which may change during the fabrication process, and in some embodiment variations closed-loop control of capillary height or wire feed rate may be employed in which the vertical position of the wire within the extrudate is sensed using capacitive, optical, or other means.

Concentricity of the wire within the extrudate in the horizontal (i.e., layer) plane is influenced by such parameters as wire stiffness, printhead speed, viscosity and solidification rate of the molten polymer, polymer strength, capillary rotational angle, and the radius of curvature of the extrudate in the horizontal plane. In some embodiment variations, capillary rotational angle (e.g., in the case of non-circular wire) is adjusted to control horizontal concentricity. In some embodiment variations, this adjustment is dynamic and in some embodiment variations closed-loop control of horizontal concentricity may be employed in which the horizontal position of the wire within the extrudate is sensed. In some embodiment variations printhead speed is reduced when depositing extrudate along small-radius toolpaths, to allow more time for the extrudate to solidify and capture the wire.

Figure 3:
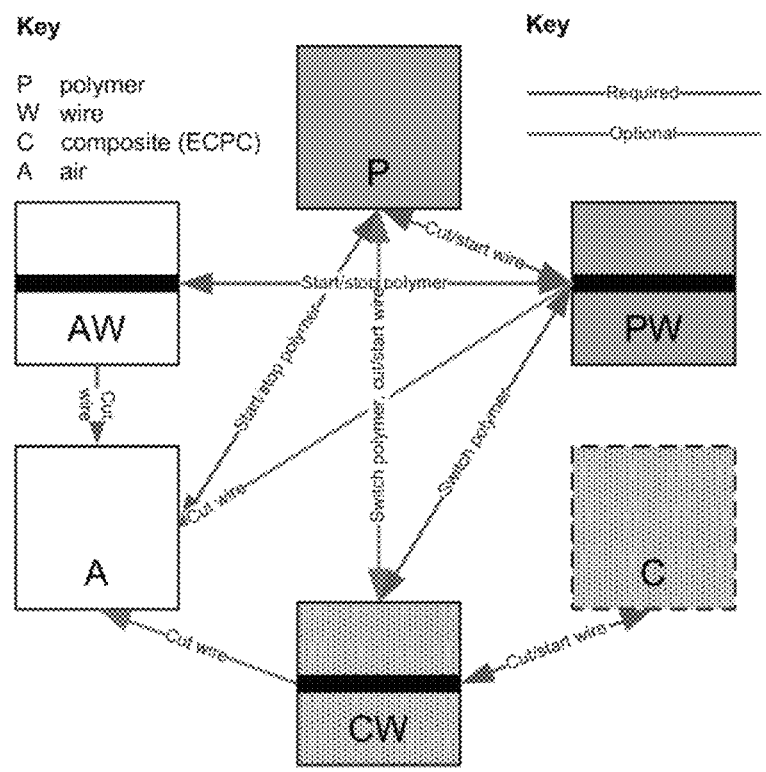
FIG. 3 is a diagram showing transitions between voxel types.

In 3dPWP, any given volume element (voxel) within the XYZ extents of the fabricated object can in principle contain one of three "homogeneous" materials (not including support material): structural polymer, ECPC, and air, as well as combinations of these materials with wire: polymer+wire (e.g., for embedded wiring), ECPC+wire (e.g., for conductive junctions), and air+wire (e.g., for actuator armatures, electrodes, etc.). Controlling which of these six types is deposited in each voxel—and transitioning cleanly among them—requires a reliable means of starting/anchoring wire, cutting wire, depositing "bare" wire with minimal polymer coating, switching between polymer and ECPC, etc. FIG. 3 depicts the six voxel types and the required transitions, as well as some optional transitions (not required for functionality, but which allow for greater design freedom). Some transitions may be impractical and possibly disallowed, such as A-AW (air to air+wire): in some embodiment variations, wire cannot be pulled from the capillary if not anchored in polymer as will be described hereinafter. The inverse transition AW-A is however, practical and allowable (e.g., by cutting the wire); all such constraints are accommodated in the software that generates toolpaths.

The functions needed to create the required transitions are 1) cutting wire, 2) starting wire, 3) producing bare wire, and 4) switching polymer type.

Figure 4A:
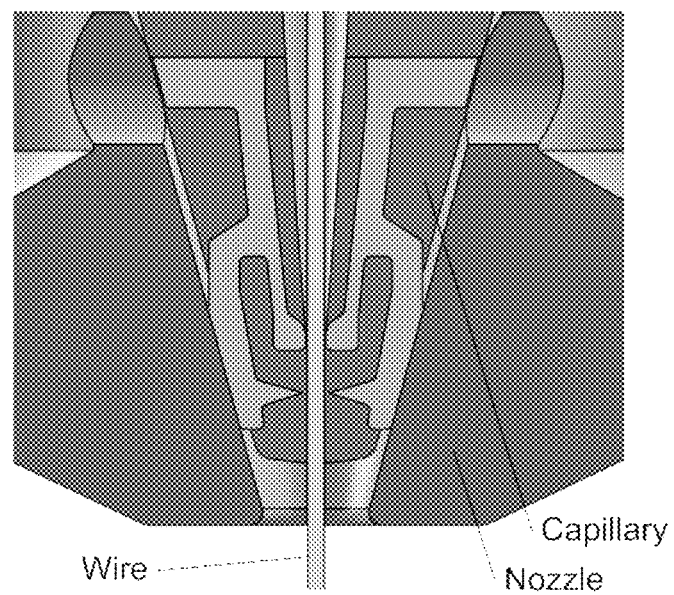
FIG. 4(a) shows a cross-section of the lower portion of a 3dPWP printhead.
Figure 4B:
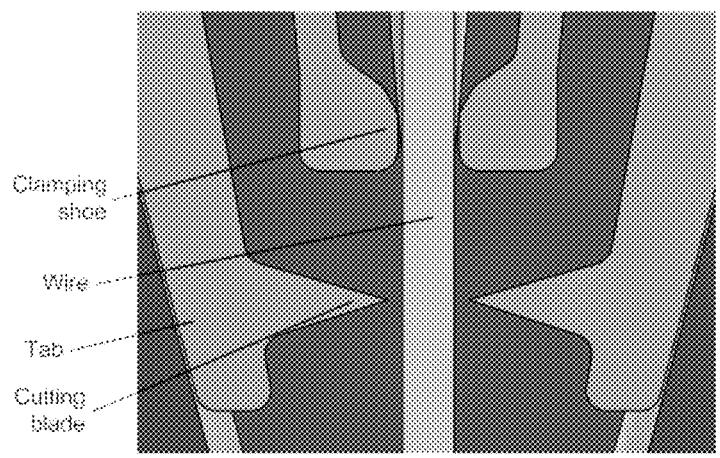
FIG. 4(b) shows a magnified cross section of the lower portion of a 3dPWP printhead.
Figure 4C:
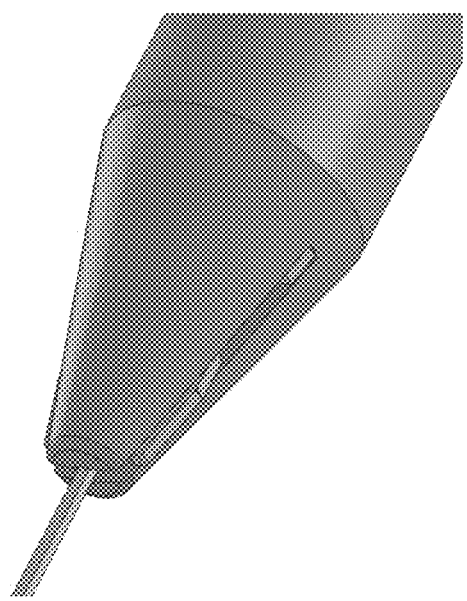
FIG. 4(c) depicts an isometric view of 3dPWP printhead capillary, clamp/cutter, and square wire.
Figure 5:
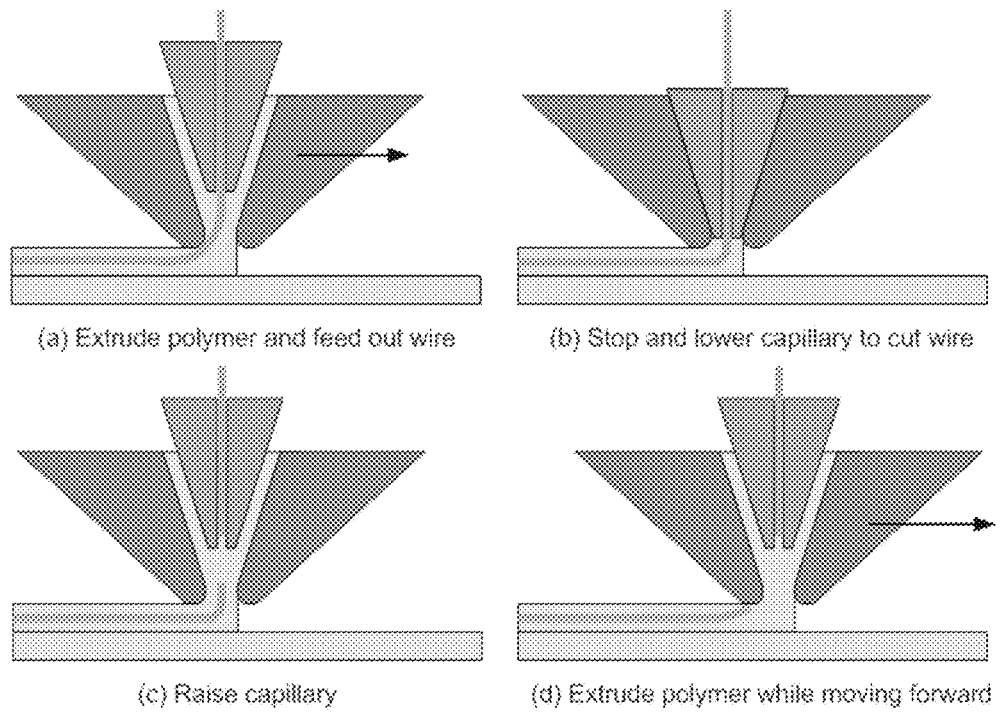
FIG. 5 depicts a wire cutting process.

In some embodiment variations, a mechanical cutter near the distal tip of the capillary may be used for cutting wire, as is needed, for example, in the PW-P transition. FIG. 4 depicts the lower portion of a printhead suitable for wire cutting in some embodiment variations. In FIG. 4(a) a cross-section of the lower portion of the printhead is shown; in FIG. 4(b) a close-up cross-section of the lower portion is shown; and in FIG. 4(c) an isometric view of the printhead capillary, clamp/cutter, and wire is shown. Within a slot in the capillary preferably perpendicular to the local axis of the deposited extrudate are mounted two small clamps/cutters, e.g., micromachined from hard steel using a process such as Laser MicroJet® cutting (Synova, Fremont, Calif.), which offers offering 5 µm accuracy and a 25 µm kerf. Each clamp/cutter includes tabs for contact with the inner taper of the printhead nozzle, wire clamping shoes through which the wire passes, cutting blades (which in some embodiment variations are staggered to provide a scissors-like shearing action), flexures, and a mounting surface. The clamps/cutters may be attached to the capillary by laser welding using an alignment fixture, crimping, an adhesive, or other means. When the capillary is translated axially and forced against the inner taper of the nozzle, the tabs are pushed inwards, bending the flexures and causing the shoes to clamp the wire. If the translation force is increased, the cutting blades are directly pushed into the wire, cutting it. FIG. 5 shows the PW-P transition; the AW-A transition is similar. In FIG. 5(a), polymer is extruded and wire is fed out; in FIG. 5(b) the printhead is stopped and the capillary is lowered, compressing the clamp/cutter to cut the wire. In FIG. 5(c), the capillary is raised, and in FIG. 5(d), the printhead is moving forward again while extruding polymer. The small length of wire that may protrude above the layer in FIG. 5(c) should be bent into and captured by the molten polymer.

In other embodiment variations, other methods are used to cut, break, or otherwise terminate the wire. For example, wire may be suddenly tensioned to break it, if well anchored in solidified extrudate. Or, wire may be broken through work hardening and fatigue by being twisted either in one direction (clockwise or counterclockwise), or twisted alternating between clockwise and counterclockwise rotation. To accomplish this with non-circular wire passing through a non-circular capillary hole, the capillary need only be rotated; with circular wire, the capillary may additionally clamp the wire before rotation. Also, wire may be broken through work hardening and fatigue by motions of the entire printhead, not just by capillary rotation. For example, the printhead may be made to oscillate in the layer plane back and forth several times. Wire may be cut using a laser, by a hot flame, or by other mechanical cutting devices such as rotating wheels or blades.

When a transition such as P-PW is required, a means of starting wire (feeding wire when the free end is not already captive inside polymer). In some embodiment variations, wire may be pushed out of the capillary by simply feeding it into the capillary (e.g., using rollers located between capillary and wire supply) in a manner that avoids buckling. In other embodiment variations, wire may be fed using a mechanism located between the capillary distal tip and the nozzle distal tip or within the capillary itself. For example, wire may be feed by vibrating the capillary or separate structures) in contact with it at sonic or ultrasonic frequencies. If the wire surface is suitably textured (e.g., with a saw tooth-like pattern), or if the wire is contacted by a suitably-textured surface (e.g., having a saw tooth-like shape), it may be made to advance in one direction through the nozzle. The motion imparted to the wire can be more complex than simple vibration (e.g., elliptical) such that each cycle the wire is grabbed, advanced slightly, and released to propel the wire: an inchworm-type of motion. In some embodiment variations, the wire can be entrained by the flow of the polymer and move along with it (possibly at a lower speed) when the wire is made free to move.

Figure 6:
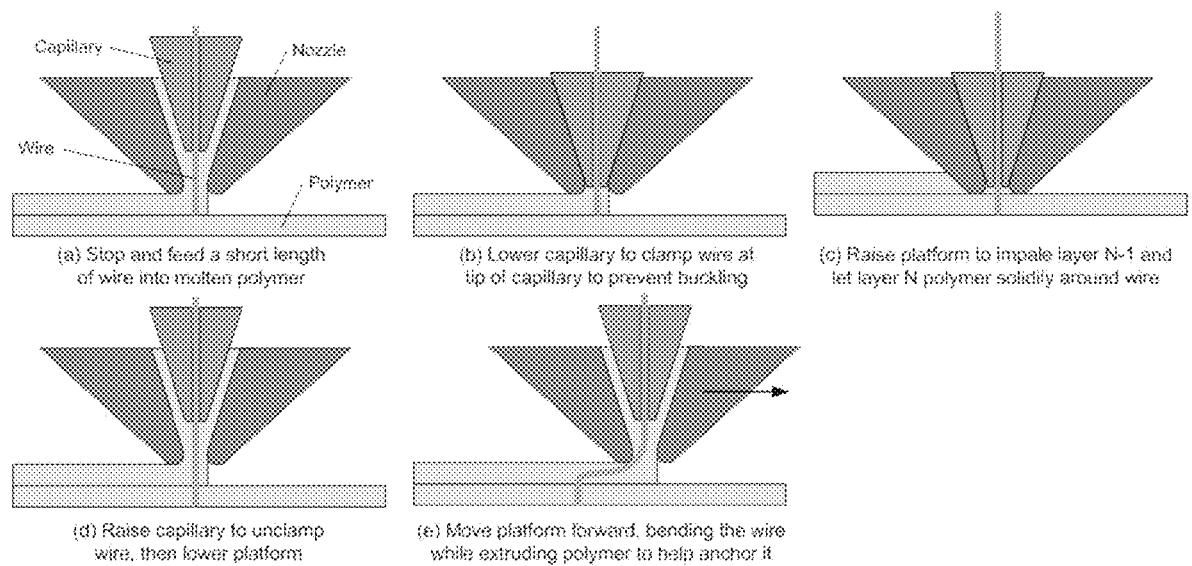
FIG. 6 depicts a wire starting and anchoring process.

In other embodiment variations, the wire is primarily pulled, not pushed, out of the capillary. Pulling the wire requires that it be initially dispensed a small amount from the capillary and then well-anchored in the polymer. For initial dispensing feed rollers can be used; these may also be used to assist with wire feeding, thus reduce the strain on the anchored wire and minimizing the risk of wire detachment or polymer tearing. FIG. 6 shows an approach to wire starting. In FIG. 6(a), the printhead is stopped (or equivalently, the build platform is stopped) and a short length of wire is fed into molten polymer. In FIG. 6(b), the capillary is lowered, clamping the wire, and in FIG. 6(c), the printhead is moved relative to layer N (the layer being formed), impaling layer N−1 with the wire (this requires that the material of layer N−1 where impaled is relatively soft) to help anchor it. In FIG. 6(e), the capillary is raised, unclamping the wire, and in FIG. 6(f), the printhead is moved forward, bending the wire, while polymer is extruded and solidifies around the wire, helping to anchor it. Wire feed distance, impale depth, capillary height, and delay before moving may be important parameters to control the anchoring process. In some embodiment variations, a suitably textured wire as described above can be employed to improve anchoring within the polymer and minimize the risk of pull-out. In some embodiment variations, the wire may be stranded or porous to encourage polymer infiltration and improved anchoring. In some embodiment variations, the wire in the vicinity of the free end may be modified to improve anchoring. For example, the process that is used to cut the wire may also impart a texture on the wire end near the cut. Or the wire may be bent near its tip (e.g., an "L", "J", or serpentine) to improve anchoring. In some embodiment variations, a FAB may be formed at the wire end and the FAB embedded inside molten polymer that is allowed to solidify. In some embodiment variations, the printhead may deposit the extrudate/embedded wire in a sharply curved (e.g., a "U") shape after starting the wire, such that the curve helps to anchor the wire. Often, wire will be started in ECPC vs. unfilled matrix; the higher viscosity of ECPC can also help anchor the wire end.

Many of the structures created with 3dPWP will be created by extruding wire and polymer together. However, there are situations where bare wire is needed, including creating solenoid cores and capacitor plates containing the maximum possible volume fraction of metal. Bare wire regions with no residual polymer coating may also be desirable for creating terminals to connect to separately-fabricated components such as batteries. In some embodiment variations, polymer coating the wire can be removed by laser processing (e.g., CO2, excimer, femtosecond), heating using a heated blade or other device (and optionally, wicking away melted polymer), burning, creating a FAB (the formation of which will damage the polymer coating), mechanical stripping (e.g., cutting and pulling, wire brush, abrasive), plasma etching, wiping the wire (while the polymer is still molten), etc.

In some embodiment variations, simply continuing to feed wire while stopping the feeding of polymer into the printhead liquefier can arrest polymer flow and yield bare wire, since the wire is surrounded by the capillary—serving as a sheath—until shortly before it exits the nozzle. In some embodiment variations, to minimize any residual coating on the wire the polymer flow is reversed so as to draw molten material away from the capillary tip. Retracting the polymer filament is commonly done in FDM to minimize the formation of thin strings or to minimize nozzle oozing. Retraction with a suitable velocity profile should extract most of the polymer from the volume between capillary and nozzle in which polymer coating of the wire normally occurs. In some embodiment variations, the surfaces within the volume to which polymer might adhere may be coated with a low surface energy material such as PTFE or AMC148-18 (Advanced Materials Components Express, State College, Pa.). Since retraction is not instantaneous, the need for bare wire is preferably anticipated by the 3dPWP apparatus control software: the printhead can be stopped or slowed, or retraction initiated before reaching the bare wire region.

Figure 7:
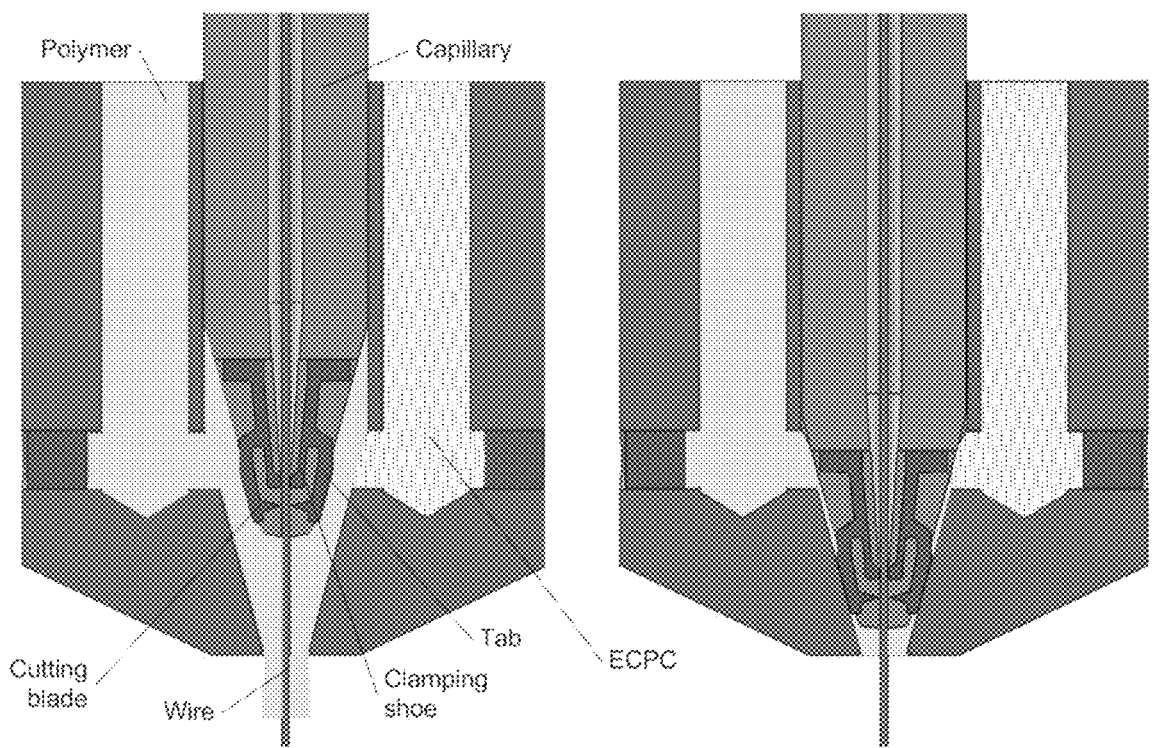
FIG. 7 shows a 3dPWP printhead dispensing polymer (left) and with the printhead purged (right).

A major advantage of using ECPC is that localized delivery of the composite material can be directly integrated into the manufacturing process. In some embodiment variations, this can be done by designing the print head nozzle with two flow channels: one for delivering polymer, and one for delivering ECPC, as shown in FIG. 7. This allows formation of conductive regions (ECPC surrounding wire, or "WC") "on the fly" as material is deposited. Any two WC regions adjacent horizontally can form an intra-layer junction, and any two adjacent vertically can form an inter-layer junction (FIG. 8).

Polymer and ECPC material are in some embodiment variations delivered to the printhead as filaments. Since relatively little ECPC material is needed when ECPC is confined to junctions, and ECPC filament due to its high filler content may be challenging to wind on a spool, relatively straight (i.e., large radius of curvature) and in some embodiment variations, larger diameter (e.g., 3 mm) replaceable lengths of ECPC filament may be used to supply the printhead.

Figure 8:
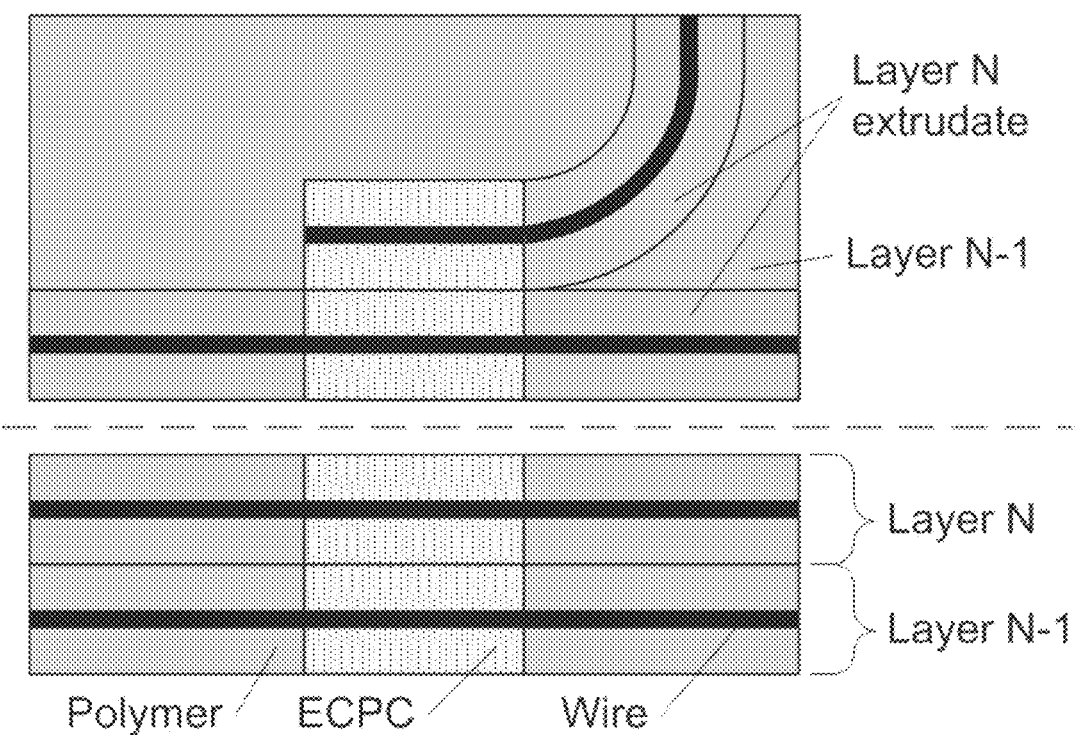
FIG. 8 shows a plan view of intra-layer junctions (top) and an elevation view of inter-layer junctions (bottom).

Each of the dispensing channels shown in FIG. 8 is downstream of a liquefier (not shown) into which filaments are fed by rollers. On the left, the printhead is operating normally, extruding polymer. On the right, the capillary has been lowered as much as possible (without causing the wire to be nicked/cut by the cutting blade) in preparation for extruding ECPC (the PW-CW transition). Since both liquefiers are "plugged" upstream by solid filament acting as a piston (as in conventional FDM), lowering the capillary purges most of the polymer from the nozzle. The capillary is then raised and the ECPC filament advanced to extrude material. The CW-PW transition follows a similar sequence. In some embodiment variations in with ECPC has limited thermal stability, elements of the printhead (e.g., the liquefier) associated with melting ECPC and keeping it at deposition temperature are cooled when no ECPC is needed soon, to prolong ECPC lifetime.

There will be some uncontrolled mixing of polymer with ECPC and vice-versa in the proposed configuration. In some embodiment variations, by exploiting the "quantized" nature of percolation in ECPCs, reasonably abrupt differences in conductivity between adjacent regions of an extrudate ("voxels") that are intended to be dielectric, and those meant to be conductive, are obtained. In some embodiment variations, the particulate filler concentration is set higher than the percolation threshold so that minor dilution by unfilled polymer doesn't lower concentration below the threshold; yet the concentration is set low enough that material in dielectric voxels contaminated with low concentrations of particulate is not rendered conductive. In some embodiment variations, long (e.g., 1-2 mm) junctions are provided, such that all "conductive" voxels within a junction need not be fully conductive to yield a low junction resistance overall. In some embodiment variations, design rules used in the layout of a printed structure can avoid locating CW-PW transitions in regions of tightly-spaced conductors (e.g., a coil) to allow for minor conductivity in PW voxels due to inter-contamination of ECPC and polymer.

In some embodiment variations square wire is used in 3dPWP for building "solid" metal volumes. In such embodiments, the capillary tip has a square orifice and the capillary rotates during extrusion such that two opposing sides of the wire remain tangential to the platform velocity, forcing the wire to bend in the correct plane and preventing wire bulging and/or layer delamination. To minimize buildup of torsion in the wire when following curved paths, in some embodiment variations the wire spool is rotated in the same direction as the capillary (e.g., synchronously). In some embodiment variations, torsion building is minimized by alternating the deposition direction of extrudates comprising a layer between a clockwise and counterclockwise direction. This may be calculated and incorporated into the toolpath planning, or the torsion sensed and the deposition direction reversed when needed.

Figure 9A:
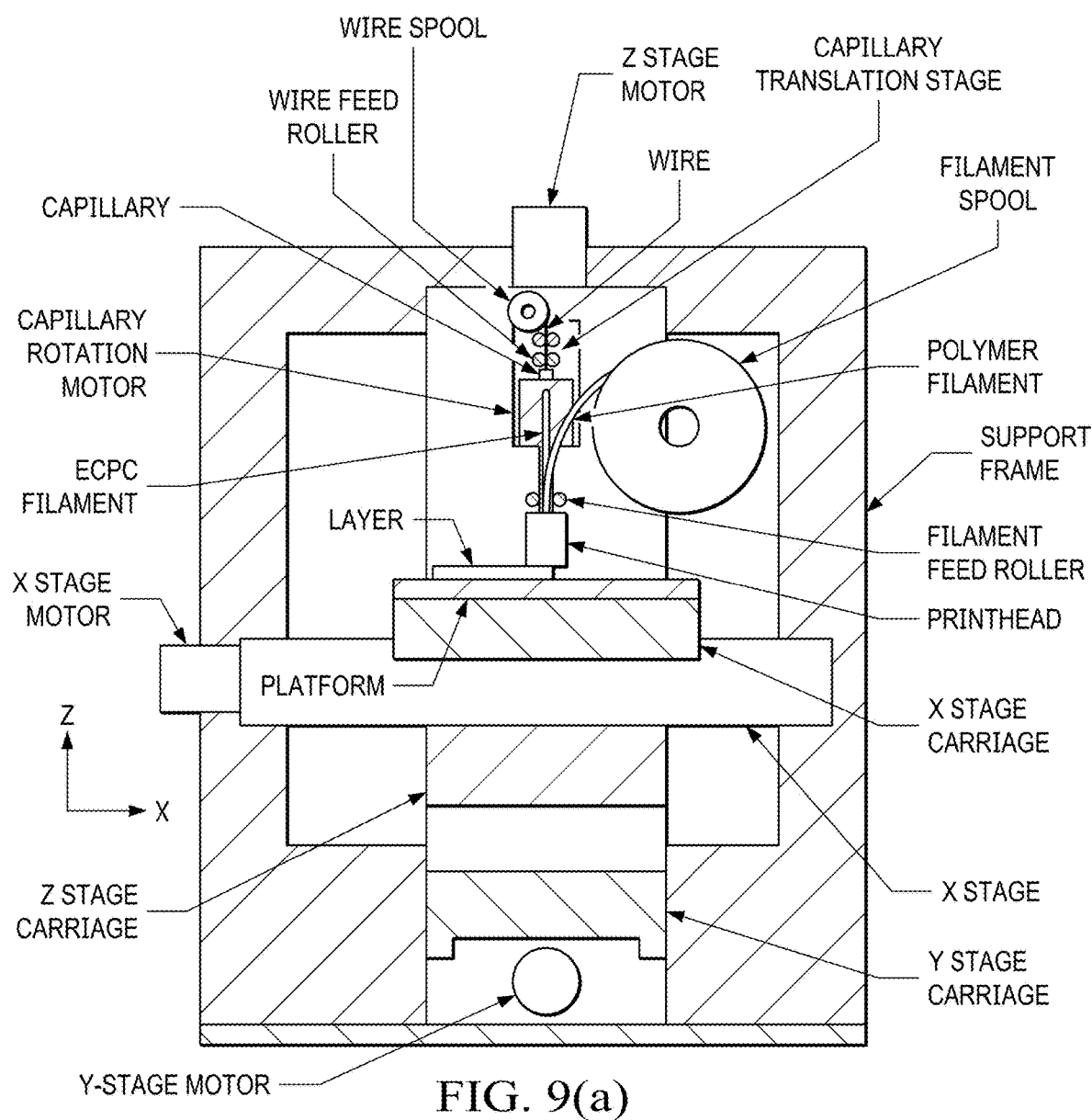
FIG. 9(a) shows apparatus for 3dPWP.
Figure 9B:
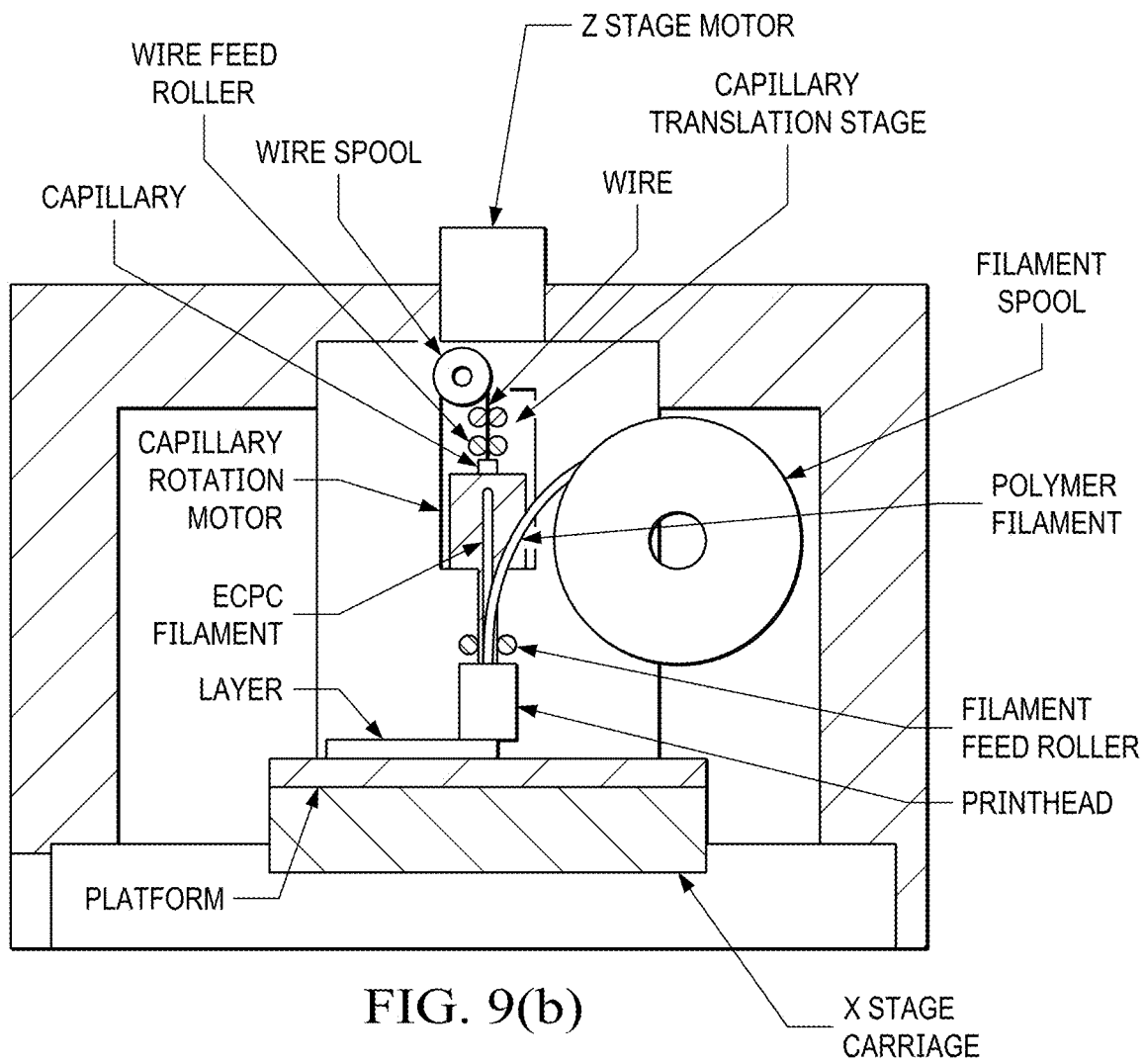
FIG. 9(b) shows an enlarged view of apparatus for 3dPWP.

An apparatus for 3dPWP may be configured in some embodiment's variations as in FIG. 9(*a*), with the printhead region shown in a magnified view in FIG. 9(*b*). The printhead capillary may be arranged to pass through a hollow rotation motor. A build platform is provided with three axes of motion using stages and motor (in other embodiment variations, the printhead may instead be provided with one or more of these axes). A spool provides polymer filament to a printhead as it is advanced by feed rollers. ECPC filament is also fed into the printhead, e.g., using feed rollers (not shown), as is wire, which may be fed using two pairs of rollers, such that the wire is heated resistively (to enhance wire coating by the polymer) by passing current from one pair to the other; inductive or other means of heating the wire may also be used. The entire apparatus is preferably enclosed within a temperature controlled environment; alternatively, the build platform may be heated. Fabrication parameters (e.g., nozzle/platform gap, toolpath curvature, and platform speed) may be varied to optimize extrudate width, height, uniformity, surface quality, defects, and residual stress due to shrinkage.

3dPWP will generally require software to generate suitable toolpaths for the printhead and to control the apparatus during fabrication. Such toolpaths may be generated by processing one or more files defining the geometry and the functionality of the object to be fabricated. In some embodiment variations, multiple files may be processed, for example, three .STL files (commonly used in additive manufacturing), each defining the location of one material (matrix material, filament, conductive matrix material/ECPC). Software generating toolpaths may in some embodiment variations preferentially route extrudates with embedded filament along user-designated or automatically distance-optimized paths on a layer, or along paths which meet other requirements of the process such as providing for intra- and inter-layer junctions or avoiding sharp bends in the wire. Extrudates needed to form the layer which do not include filament are also routed, but at a lower priority and in some embodiment variations, in a secondary process.

3dPWP can be used to make and integrate into co-fabricated devices—either singly or in a distributed fashion—a wide variety of electromagnetic and electrostatic actuators and sensors. Electromagnetic actuators that can be fabricated include solenoids (linear and rotary), voice coils, and motors; electrostatic actuators include "comb drive" and parallel-plate electrostatic actuators. Electromagnetic sensors that can be produced include linear variable differential transformers, variable-reluctance sensors, and fluxgate sensors. Electrostatic sensors that can be made include capacitive sensors such as those using surface or projected capacitance.

Figure 10:
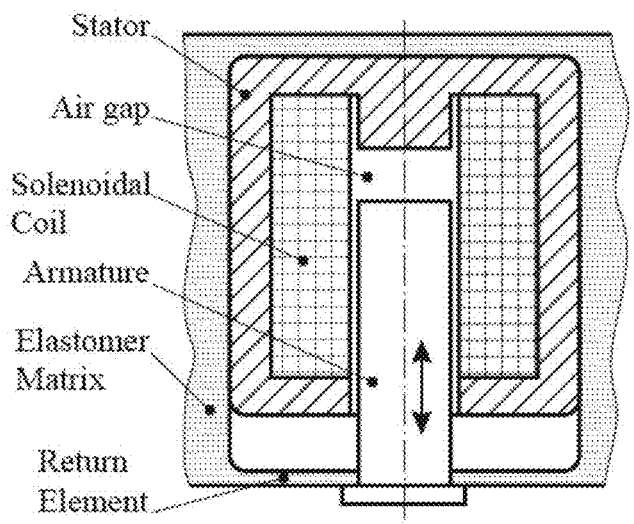
FIG. 10 Shows a schematic of a plunger type solenoid actuator (PRIOR ART).

Among the devices that can be made using 3dPWP are DC plunger-type solenoid actuators. Such actuators are in some embodiment variations readily distributed through a robot limb or body and connected by wiring. A typical plunger solenoid actuator (FIG. 10) has a coil wrapped around a solid or laminated ferromagnetic armature (plunger). When current flows in the coil, the magnetic field produced in the core attracts the plunger with a force roughly proportional to the square of the coil current [Brauer, 2006]. As the plunger moves inward, an element such as a spring is deformed; when current stops this returns the plunger to its original position. A ferromagnetic stator surrounding the coil strengthens the flux and improves performance. In some embodiment variations, solenoids may be cascaded in series end-to-end (i.e., the plunger of solenoid N connected to the body of solenoid N+1, etc.) to increase displacement, or arranged in parallel to increase force, or in a combination of series and parallel arrangements.

Figure 11:
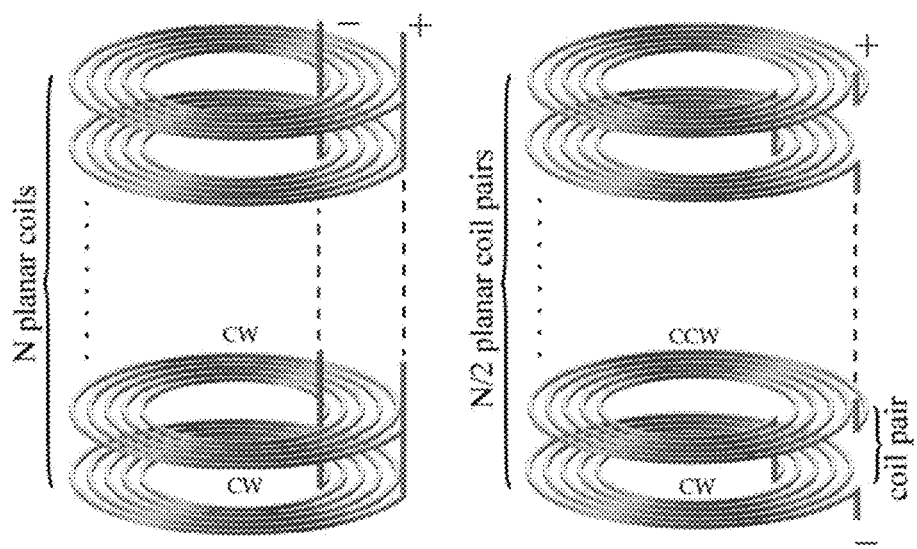
FIG. 11 depicts two coil architectures: stacked planar spiral coils connected in parallel (left) and stacked pairs of spiral coils connected in series.

Solenoid actuators may be made using 3dPWP in several ways. In some embodiment variations, a trench is provided that spans multiple layers, and a coil is continuously wound within the trench using PW voxels, much like a standard coil. In other embodiment variations, as shown in FIG. 11 (left), the coil is made from stacked spiral planar coils: coils are wound clockwise (as shown, or counterclockwise) and joined vertically both at the inside and the outside of the coil stack, such that all are electrically connected in parallel. Such an arrangement reduces overall coil resistance. In still other embodiment variations, as shown in FIG. 11 (right), the coil is made from stacked pairs of spiral planar coils: one coil of each pair is wound clockwise from outside to inside, while the other is wound counterclockwise from outside to inside. The inside ends of both of these are then wired in series, such that current flows clockwise (or counterclockwise) through both of the coils in the pair. Such an arrangement also reduces overall coil resistance, and such paired coils may be continuously wound (i.e., both coils wound without interrupting the wire) or wound separately and joined; if the former, then in some embodiment variations each coil of the pair may be only half the typical layer thickness, with the pair as thick as the typical layer. In this configuration both connections are on the outside of the coil stack. In some embodiment variations, such as to allow closer spacing of coil turns and increase the number of turns in the coil, the capillary is lowered partially to reduce the thickness of the polymer coating the wire.

Figure 12:
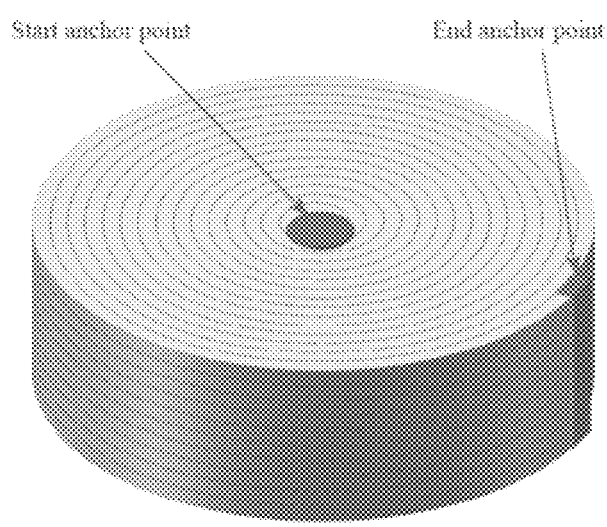
FIG. 12 shows a cross-section of plunger formed by stacking tight spirals of bare square Ni wire.

In some embodiments, variations to improve the force/current characteristic of the actuator, e.g., the plunger and stator have a large relative magnetic permeability, and may be made from stacked, spirally-wound bare wire such as nickel (Ni μr=110-600) or Ni-based ECPC, as in FIG. 12, as possible. In some embodiment variations the two ends of the wire on each layer can be anchored in polymer. To facilitate winding elements made from bare wire and in some cases, small radii such as these, the capillary may be lowered within the printhead to better control the wire position. Square or rectangular wire vs. round wire is used in some embodiment variations as it can be wrapped to form dense solenoid cores, stators, and capacitor plates; it's also easier to clamp and have its position sensed within the extrudate (e.g., capacitively or optically). In some embodiment variations, the plunger is supported by a flexible (e.g., elastomer) diaphragm or bellows, allowing axial motion and optionally, providing a return force.

In other embodiments, 3dPWP may be applied to making structures from materials other than polymers. For example, FDM has been used to fabricate "green" ceramic parts (made from ceramic particles and a polymer binder), which are fired at high temperature after fabrication to form a ceramic of the desired properties. Using wire that is sufficiently refractory, 3dPWP can be used to make ceramic products with embedded wiring, passive components (e.g., capacitors, inductors, and antennas), etc. The resulting parts are similar in some respects to low-temperature or high-temperature co-fired (LTCC or HTCC) ceramic parts, but offer far more complex 3-D geometry and easier, more automated fabrication. In such a case, ECPC is replaced by a conductive material of the kind normally used for LTCC/HTCC metallization, such as a conductive paste containing Ag or Cu.

In other variations, bare die or packaged ICs (e.g., microprocessors, signal processors), optoelectronic components (e.g., camera chips, LEDs), MEMS sensors, magnets, and hardware components such as bearings can be integrated into 3dPWP-produced components, for example, by using integrated pick-and-place assembly hardware to position parts into a structure while it's being fabricated. Connections to pads on semiconductor die can be made by wire bonding between pad and 3dPWP wiring using standard wire bonding techniques. Or, if the pad pitch matches the minimum 3dPWP line width, by direct connection of pad to wire using conductive polymer, much like flip chip assembly performed with conductive adhesives.

Other variations can include multiple wires may be co-deposited simultaneously within a single extrudate. 3dPWP can also be expanded to include composites with magnetic filler materials (e.g., NdFeB powder). "Active" wire materials (such as shape memory alloy wire or contractile nanotube yarn [Lima et al., 2012]) may be substituted for ordinary wire in the printhead, offering more actuator options.

The basic approach of 3dPWP can be broadly expanded to address a wide variety of technical needs. For example, instead of embedding conductive wires, in some embodiment variations fluid conduits (tubes) or optical fiber could be embedded instead. Likewise, hard materials or polymers with tailored optical properties may be used, facilitating direct fabrication of microfluidic devices with integrated optical components for optical sample analysis.

Advanced electromagnetic actuators such as voice coils and rotary motors can be fabricated through the integration of a permanent magnetic material and suitable bearings. Permanent magnetic material may be deposited (e.g., NdFeB powder in a polymer matrix) by modifying the 3dPWP printhead to accept a third material. Bearings can be produced by wrapping wire to form circular shafts and sleeves. Or, prefabricated magnets and bearings can simply be inserted into suitable cavities.

3dPWP-produced components can incorporate pneumatic or hydraulic actuators, as well as channels, reservoirs, and even pumps. Such actuators need a source of pressurized fluid, offer a large range of motion and high power, and can be made MRI-compatible for medical devices such as surgical/interventional instruments. For example, a catheter for treating atrial fibrillation could unfold and navigate inside the heart using built-in actuators, deploying an electrode array for mapping and ablating tissue. Better and more natural-appearing prosthetics, such as a 3dPWP-fabricated human hand, custom-made for an amputee, should become possible. While actuators embedded in such a hand may be far weaker than human forearm muscles, dexterity and touch sensitivity could be enormously improved over current devices. Using materials such as Pt-Ir wire and long-term implantable polymers (e.g., Bionate® thermoplastic polycarbonate polyurethane (DSM Biomedical, Berkeley, Calif.)), implants such as drug-delivery pumps and neurostimulation devices could be made, complete with coils for transcutaneous inductive charging and communication. Orthotics for tremor control using magnetorheological dampers could also benefit from custom, low-profile, built-in flexible coils: magnetorheological fluids can be used to provide variable damping by varying viscosity as a function of applied current.

By surrounding at least one wire with others that surround it (e.g., oriented substantially parallel to it) to form a shield, low-loss coaxial-type micro/millimeter-wave transmission lines and passives also become possible, allowing for example, a phased-array radar system to be built into the wing of a small unmanned air vehicle. Such a wing could furthermore alter its shape using buried actuators to optimize performance, or even flap like a bird or insect wing.

3dPWP's feature size is comparable to that used in microfluidic devices, which perform analysis or synthesis quickly using small amounts of material. A shortcoming with such devices is the need for pumps; using 3dPWP solenoid-actuated peristaltic pumps could be integrated into a disposable device, as well as channels, reservoirs, active and passive valves, heaters, electrodes, and optical fiber probes.

Complex, bespoke wearable electronics including clothing and helmets that incorporate physiological sensing (e.g., blood pressure, ECG), inertial sensors, cellular and wireless communications, GPS, displays, fluidic temperature regulation, etc., are enabled by 3dPWP. The Nike+ FuelBand, a smart elastomer wristband that tracks activities like running using embedded accelerometers, is a first step toward what is possible. Virtual reality and motion capture input devices such as finger position-sensing gloves and garments, as well as haptic displays for force and touch are also achievable using 3dPWP.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. In certain embodiments, the present invention may also include methods and compositions in which the transition phrase "consisting essentially of" or "consisting of" may also be used.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

Agarwala, M. K., et al. (1996), "Fused Deposition of ceramics and metals: an overview. Solid Freeform Fabrication Symposium Proceedings, Austin, Tex., August 1996, pp. 385-392.

Matthew Paul Alonso et al. (2009) "Reprinting the Telegraph: Replicating the Vail Register using Multi-materials 3D Printing", Solid Freeform Fabrication Symposium Proceedings, Austin, Tex., August 2009, pp. 761-769.

R. K. Bayer et al. (1988) "Conductive PE-carbon composite by elongation flow injection moulding, Part 1—Flow-induced conductivity profile-high molecular weight matrix", Journal of Materials Science, 23, 475-480.

Jacob Bayless et al. (2010) "Wire Embedding 3D Printer", University of British Columbia (http://reprap.org/mediawiki/images/2/25/SpoolHead_FinalReport.pdf).

John Brauer (2006) Magnetic Actuators and Sensors, Wiley, ch. 7.

Mark R. Cutkosky and Sangbae Kim (2009) Design and fabrication of multi-material structures for bioinspired robots. Phil. Trans. R. Soc. A 2009 367, pp. 1799-1813.

Erick DeNava et al. (2008) "3D Off-Axis Component Placement and Routing with Solid Freeform Fabrication," Solid Freeform Fabrication Symposium Proceedings, Austin, Tex., August 2008, pp. 362-369.

Olaf Diegel et al. (2011) "Getting rid of the wires: Curved Layer Fused Deposition Modeling in Conductive Polymer Additive Manufacturing", Key Engineering Materials (Volumes 467-469), pp. 662-667.

Jiri George Drobny (2011) Polymers for Electricity and Electronics: Materials, Properties, and Applications, Wiley, pp. 225-227.

Kurt Elkins et al. (1997) "Soft Elastomers for Fused Deposition Modeling", Solid Freeform Fabrication Symposium Proceedings, Austin, Tex., August 1997, pp. 441-448.

Laurentiu Encica et al. (2008) "Passive and active constant force-displacement characteristics and optimization of a long-stroke linear actuator," 11th International Conference on Optimization of Electrical and Electronic Equipment, OPTIM 2008, pp. 117-124, 22-24 May 2008.

David Espalin et al. (2012) "Multi-Material, Multi-Technology FDM System", Solid Freeform Fabrication Symposium Proceedings, Austin, Tex., August 2012, pp. 828-835.

T. A. Ezquerra et al. (1988) "Conductive PE-carbon black composites by elongation flow injection moulding, Part 2—Variation of the molecular weight of the matrix", Journal of Materials Science, 23, 4121-4126.

L. Flandin et al. (2001) "Interrelationships between electrical and mechanical properties of a carbon black-filled ethylene-octene elastomer", Polymer, 42, 827-838.

Ken Gilleo (2000) "Flip Chip Assembly with Conductive Adhesives", Proceedings, 2000 HD International Conference on High-Density Interconnect and Systems Packaging, Denver, Colo., April 2000, pp. 256-260.

George Harman (1997) Wire Bonding in Microelectronics: Materials, Processes, Reliability, and Yield, McGraw-Hill Professional, 2nd edition (Jun. 1, 1997).

J.-C. Huang (2002) "Carbon Black Filled Conducting Polymers and Polymer Blends", Advances in Polymer Technology, 21, 299-313.

D. M. Kalyon et al. (2002) "Electrical Properties of Composites as Affected by the Degree of Mixedness of the Conductive Filler in the Polymer Matrix", Polymer Engineering and Science, 42, 1609-1617.

David M. Kozlak et al. (2011) U.S. Pat. No. 7,917,243, Mar. 29, 2011.

David M. Kozlak (2011) U.S. Pat. No. 8,070,473, Dec. 6, 2011.

S. Kumar and J.-P. Kruth (2010) "Composites by rapid prototyping technology", Materials and Design 31, pp. 850-856.

B. Lesquesne (1988) "Finite element analysis of a constant force solenoid for fluid flow control", IEEE Trans. Indust. Appl., Vol. 24, pp. 574-581.

Y. Li and H. Shimizu (2009) "Toward a Stretchable, Elastic, and Electrically Conductive Nanocomposite: Morphology and Properties of Poly[styrene-b-(ethylene-co-butylene)-b-styrene]/Multiwalled Carbon Nanotube Composites Fabricated by High-Shear Processing", Macromolecules, 42, 2587-2593.

Marcio D. Lima et al. (2012), "Electrically, Chemically, and Photonically Powered Torsional and Tensile Actuation of Hybrid Carbon Nanotube Yarn Muscles", Science 16 Nov. 2012: Vol. 338 no. 6109 pp. 928-932.

Daniel Lipsker (2000) U.S. Pat. No. 6,153,034, Nov. 28, 2000.

John Lang Lombardi et al. (2002) U.S. Pat. No. 6,437,034, Aug. 20, 2002.

Amit Joe Lopes et al. (2012) "Integrating stereolithography and direct print technologies for 3D structural electronics fabrication", Rapid Prototyping Journal, Vol. 18 Iss: 2, pp. 129-143

Evan Malone and Hod Lipson (2008), "Multi-material Freeform Fabrication of Active Systems, Proceedings of the 9th Biennial ASME Conference on Engineering Systems Design and Analysis, July 2008, Haifa, Israel.

Evan Malone and Hod Lipson (2007) "Freeform Fabrication of a Complete Electromechanical Relay", Solid Freeform Fabrication Symposium Proceedings, Austin, Tex., August 2007, pp. 513-526.

S. H. Masood, W. Q. Song (2004) "Development of new metal/polymer materials for rapid tooling used Fused Deposition Modelling", Materials and Design 25, pp. 587-594.

Jorge Mireles et al. (2012) "Fused Deposition Modeling of Metals", Solid Freeform Fabrication Symposium Proceedings, Austin, Tex., August 2012, pp. 836-845.

Thomas F. McNulty et al. (1998) "Development of a Binder Formulation for Fused Deposition of Ceramics", Rapid Prototyping Journal, Vol. 4 Iss: 4, pp. 144-150.

M. Nikzad et al. (2011) "Thermo-mechanical properties of a highly filled polymer composites for Fused Deposition Modeling" Materials and Design 32, pp. 3448-3456.

Seyi Onagoruwa et al. (2001) "Fused Deposition of Ceramic (FDC) and Composites", Solid Freeform Fabrication Symposium Proceedings, Austin, Tex., August 2001, pp. 224-231.

Mike O'Reilly and Jeff Leal (2010) "Jetting Your Way to Fine-pitch 3D Interconnects", Chip Scale Review, October 2010.

Periard et al. (2007) "Printing Embedded Circuits" Solid Freeform Fabrication Symposium Proceedings, Austin, Tex., August 2007.

Joshua E. Rabinovich (1996) U.S. Pat. No. 5,578,227, Nov. 26, 1996.

G. R. Ruschau and R. E. Newnham (1992) "Critical Volume Fractions in Conductive Composites", Journal of Composite Materials, 26, 2727.

G. R. Ruschau et al. (1992) "Resistivities of conductive composites", Journal of Applied Physics, 72, 953-959.

K. P. Sau et al. (1997) "Conductive rubber composites from different blends of ethylene-propylene-diene rubber and nitrile rubber", Journal of Materials Science, 32, 5717-5724.

Sangok Seok, "Meshworm: A Peristaltic Soft Robot With Antagonistic Nickel Titanium Coil Actuators", IEEE/ASME Transactions on Mechatronics 1 (in publication).

Yonas Tadesse et al. (2011) "Twelve Degree of Freedom Baby Humanoid Face using Shape Memory Alloy Actuators", Journal of Mechanisms and Robotics vol. 3, pp. 1-18.

R. Vaidyanathan et al. (1999) "Extrusion Freeform Fabrication of Functional Ceramic Prototypes", Solid Freeform Fabrication Symposium Proceedings, Austin, Tex., August 1999, pp. 327-334.

Ian D. Walker et al. (2005) "Continuum Robots Arms Inspired by Cephalopods", Unmanned Ground Vehicle Technology VII, Proceedings of SPIE Vol. 5804.

Ryan Wicker et al., U.S. Pat. No. 7,556,490, Jul. 7, 2009.

What is claimed is:

1. A system for a multi-material additive manufacturing process comprising:
a nozzle configured to move along one or more axes, the nozzle configured to extrude a solidifiable material to form an extrudate;
a fiber feeding capillary configured to move along the one or more axes, configured to receive one or more solid fibers and configured to guide the one or more solid fibers into contact with the solidifiable material and out through the nozzle, wherein the fiber feeding capillary is positioned within the nozzle, wherein a distal tip of the fiber feeding capillary is configured to extend;
a fiber feeding mechanism configured to advance the one or more fibers through the fiber feeding capillary, the fiber feeding mechanism configured to advance the one or more fibers through the fiber feeding capillary and out through the nozzle concurrently as the nozzle extrudes the solidifiable material, wherein the one or more fibers are embedded within or are in, on or about the extrudate from the nozzle; and
a cutter capable of severing the one or more solid fibers, wherein the distal tip of the fiber feeding capillary comprises a slot, wherein the cutter is positioned within the slot.

2. The system of claim 1, wherein the one or more solid fibers is dispensed nominally coaxial with the extrudate.

3. The system of claim 1, wherein the one or more fibers is a metal, a semiconductor, a ceramic, a conductor, a conductive polymer, a magnetic material, a conductive powder, a fiber, an optical fiber, a tube, or a conductive thermoplastic polymer.

4. The system of claim 1, wherein the one or more solid fibers are wound into coils, formed into a block, formed into a cylinder or other shapes to form one or more actuators, sensors, thermal management structures, switches, transformers, fuses, resistors, capacitors, inductors, antennae, batteries, external connecting pads, variable-resistance resistors, capacitors, inductors, force sensors, pressure sensors, temperature sensors, cores and armatures for electromagnetic devices, capacitor plates, heat sinks, displays, solenoids, heat conduction structures or power supplies.

5. The system of claim 1, wherein two or more of the one or more solid fibers are formed into one or more mechatronic structures.

6. The system of claim 1, wherein the solidifiable material is a thermoplastic material, a dielectric material, an elastomeric material, or a deformable material.

7. The system of claim 1, wherein the one or more solid fibers are connected electrically by a metal, a semiconductor, a ceramic, a conductor, a conductive polymer, a conductive powder, or a conductive thermoplastic polymer.

8. The system of claim 1, further comprising connecting one or more integrated circuits, actuators, sensors, thermal management structures, switches, transformers, fuses, resistors, capacitors, inductors, antennae, batteries, external connecting pads, variable-resistance resistors, capacitors, inductors, force sensors, pressure sensors, temperature sensors, cores and armatures for electromagnetic devices, capacitor plates, heat sinks, displays, solenoids, heat conduction structures or power supplies, to the one or more solid fibers.

9. The system of claim 1, wherein the one or more solid fibers are defined further as one or more sacrificial fibers that when removed create one or more open conduits or vias.

10. The system of claim 1, wherein the one or more solid fibers are surrounded by a dielectric and the dielectric is removable by at least one method selected from laser processing, heating, mechanical stripping, or plasma etching.

11. The system of claim 1, wherein the one or more solid fibers are joined by welding, soldering, brazing, ultrasonic/thermosonic bonding, crimping, winding, pressure contact, or mutual entanglement.

12. The system of claim 1, wherein the solidifiable material comprises a thermoplastic material, the system further comprising a computer that controls extruding the thermoplastic material and the one or more solid fibers.

13. The system of claim 1, wherein the one or more solid fibers is dispensed so that its major axis is substantially parallel to the major axis of the extrudate.

14. The system of claim 1, wherein the fiber feeding capillary is positioned within the nozzle.

15. The system of claim 1, further comprising a clamping shoe connected to the cutter, wherein the clamping shoe is positioned within the slot.

16. The system of claim 15, wherein the clamping shoe and the cutter are positioned relative to a distal tip of the nozzle such that moving the distal tip of the fiber feeding capillary towards the distal tip of the nozzle by a first distance causes the clamping shoe to clamp the one or more solid fibers positioned within the fiber feeding capillary and moving the distal tip of the fiber feeding capillary towards the distal tip of the nozzle by a second distance greater than the first distance causes the cutter to cut the clamped one or more solid fibers.

17. The system of claim 1, wherein the nozzle and the fiber feeding capillary are configured to axially translate relative to each other.

18. A system for a multi-material additive manufacturing process comprising:
   a nozzle configured to move along one or more axes, the nozzle configured to extrude a solidifiable material to form an extrudate that forms at least a portion of a multi-material structure;
   a fiber feeding capillary positioned within the nozzle and configured to axially translate relative to the nozzle, the fiber feeding capillary configured to move along the one or more axes and configured to receive one or more solid fibers and guide the one or more solid fibers into contact with the solidifiable material and out through the nozzle; and
   a fiber feeding mechanism configured to advance the one or more solid fibers through the fiber feeding capillary, the fiber feeding mechanism configured to advance the one or more fibers that form at least another portion of the multi-material structure through the capillary and out through the nozzle concurrently as the nozzle extrudes the solidifiable material; and
   a cutter capable of severing the one or more solid fibers, wherein a distal tip of the fiber feeding capillary comprises a slot, wherein the cutter is positioned within the slot.

* * * * *